United States Patent [19]

Ohtsuki et al.

[11] Patent Number: 4,869,353

[45] Date of Patent: Sep. 26, 1989

[54] SYNCHRONIZING CLUTCH ASSEMBLY

[75] Inventors: Kazuhiko Ohtsuki, Takarazuka; Gen Yoshii, Mukonoso-Honmachi; Toshiaki Okanishi, Kobe, all of Japan

[73] Assignee: Kanzaki Kokyukoki Mfg. Co., Ltd., Amagasaki, Japan

[21] Appl. No.: 268,332

[22] Filed: Nov. 7, 1988

[30] Foreign Application Priority Data

Nov. 27, 1987 [JP] Japan .................. 62-299148

[51] Int. Cl.$^4$ .................. F16D 11/04; F16D 13/28
[52] U.S. Cl. ................. 192/53 F; 74/339
[58] Field of Search ............. 192/53 E, 53 F, 48.91; 74/339

[56] References Cited

U.S. PATENT DOCUMENTS

| | | | |
|---|---|---|---|
| 2,190,964 | 2/1940 | White | 192/53 A |
| 2,221,900 | 11/1940 | White | 192/53 R |
| 2,932,373 | 4/1960 | Schmid | 192/53 A |
| 3,703,226 | 11/1972 | Strehler et al. | 192/48.91 |
| 4,185,725 | 1/1980 | Maina | 192/53 F |
| 4,413,715 | 11/1983 | Michael | 192/53 F |
| 4,573,371 | 3/1986 | Akutagawa | 192/53 F X |
| 4,625,844 | 12/1986 | Ikemoto et al. | 192/53 F |
| 4,628,751 | 12/1986 | Ikemoto | 74/339 |

FOREIGN PATENT DOCUMENTS

| | | |
|---|---|---|
| 292319 | 11/1988 | European Pat. Off. |
| 1259210 | 5/1964 | Fed. Rep. of Germany. |
| 1600240 | 2/1970 | Fed. Rep. of Germany. |
| 1815372 | 7/1970 | Fed. Rep. of Germany. |
| 1755457 | 5/1971 | Fed. Rep. of Germany. |
| 2006984 | 7/1971 | Fed. Rep. of Germany. |
| 3637372 | 11/1986 | Fed. Rep. of Germany. |
| 1012482 | 10/1949 | France. |
| 2221979 | 10/1974 | France. |
| 1137332 | 12/1968 | United Kingdom. |

*Primary Examiner*—Randolph A. Reese
*Assistant Examiner*—Arlen L. Olsen

[57] ABSTRACT

In an inertia lock- and key-type synchronizing clutch assembly, engagement between conical clutch surfaces (29, 36) of a clutch gear (28) and synchronizer ring (35) is enhanced spontaneously under a servo action by a cam means disposed between the synchronizer ring (35) and a hub member (31). Two problems arising from the servo action are solved by additional structures provided to a key member (39) and to the synchronizer ring. That is, an unexpected spontaneous engagement of the clutch mechanism from a neutral condition thereof is prevented with certainty by a cooperation of the key member and a pair of stopper projection (48, 49) on the synchronizer ring. The key member includes at an inner surface thereof a recess (50) for permitting a rotational displacement of the sychronizer ring when a clutch-engaging operation is performed. An end face of such recess includes a ramp surface (51; 51A; 51B) which cooperates with one of the projections of the synchronizer ring so as to assure a clutch-disengaging operation even when a re-engagement of the clutch surfaces due to the servo action is caused in a clutch-disengaging process.

12 Claims, 20 Drawing Sheets

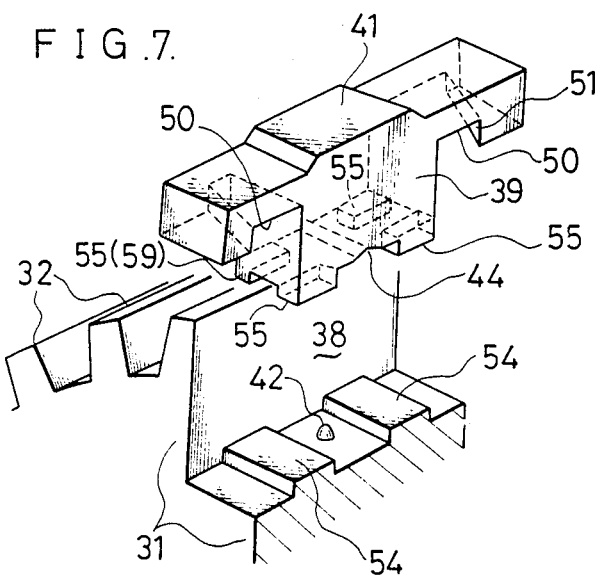
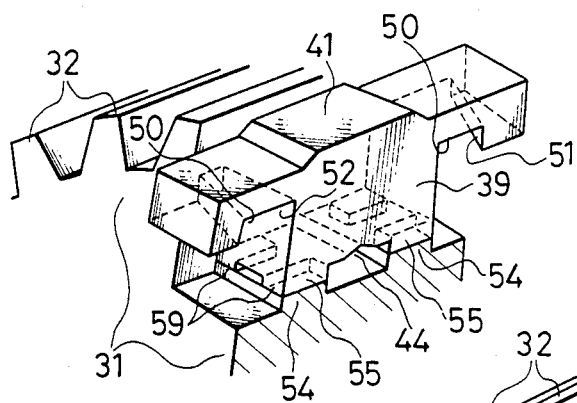
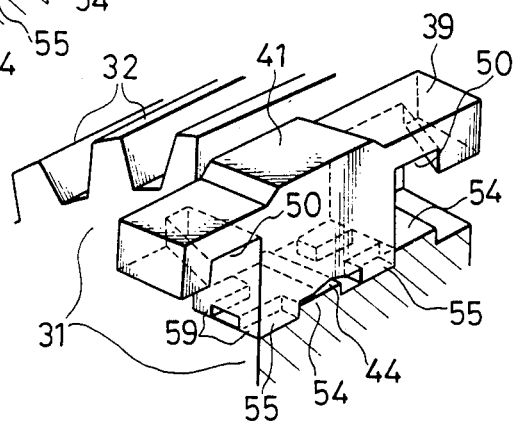

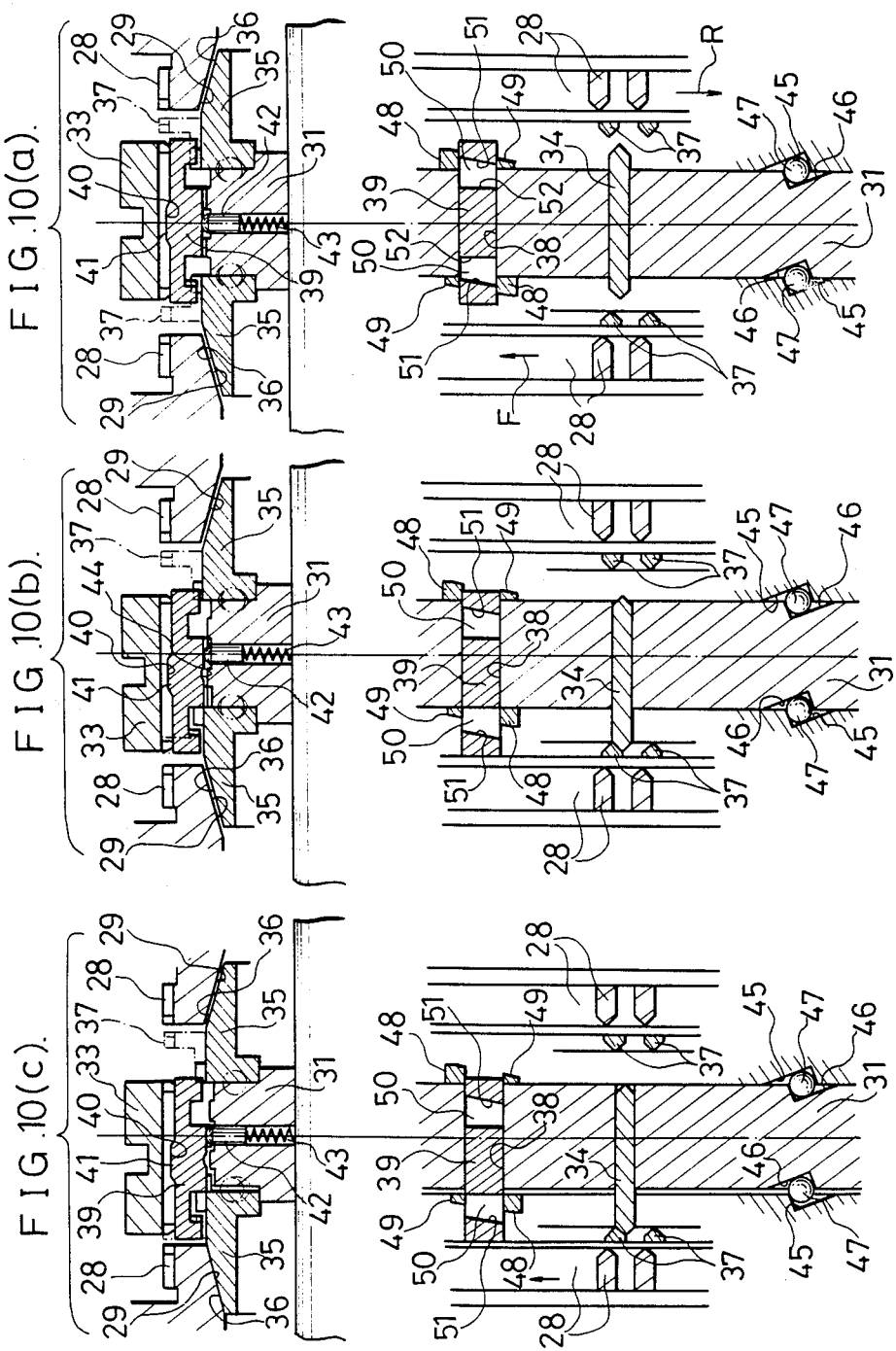

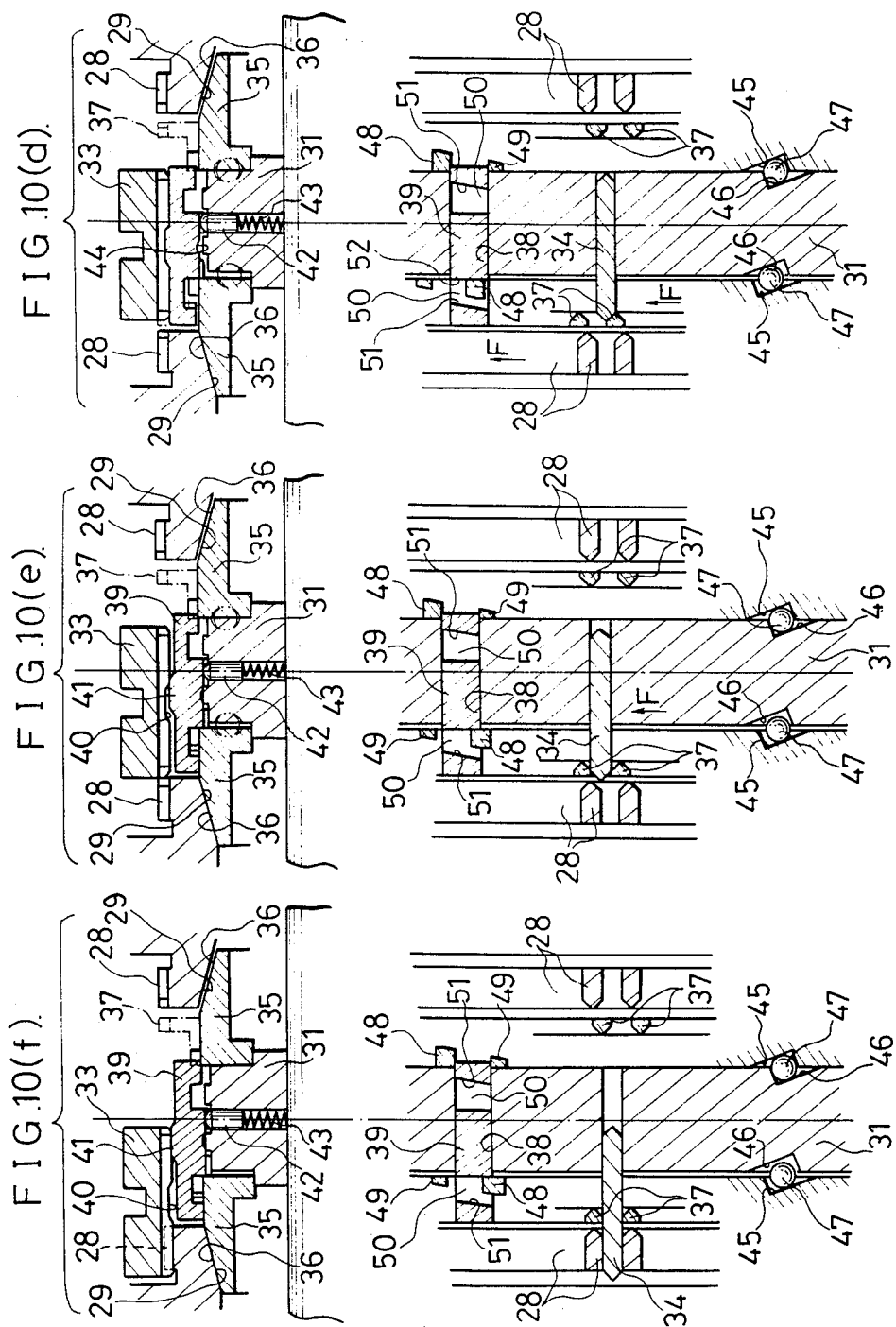

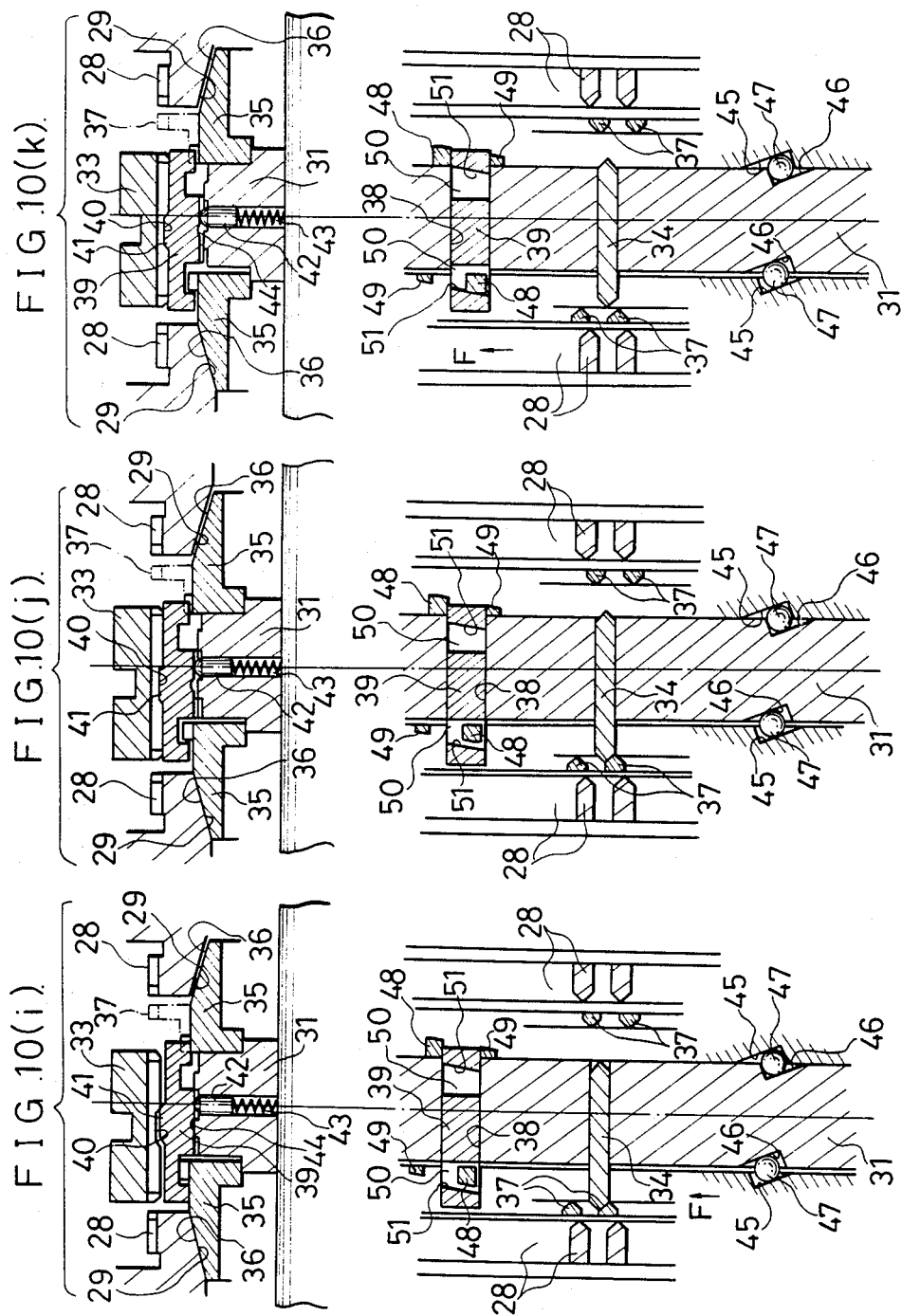

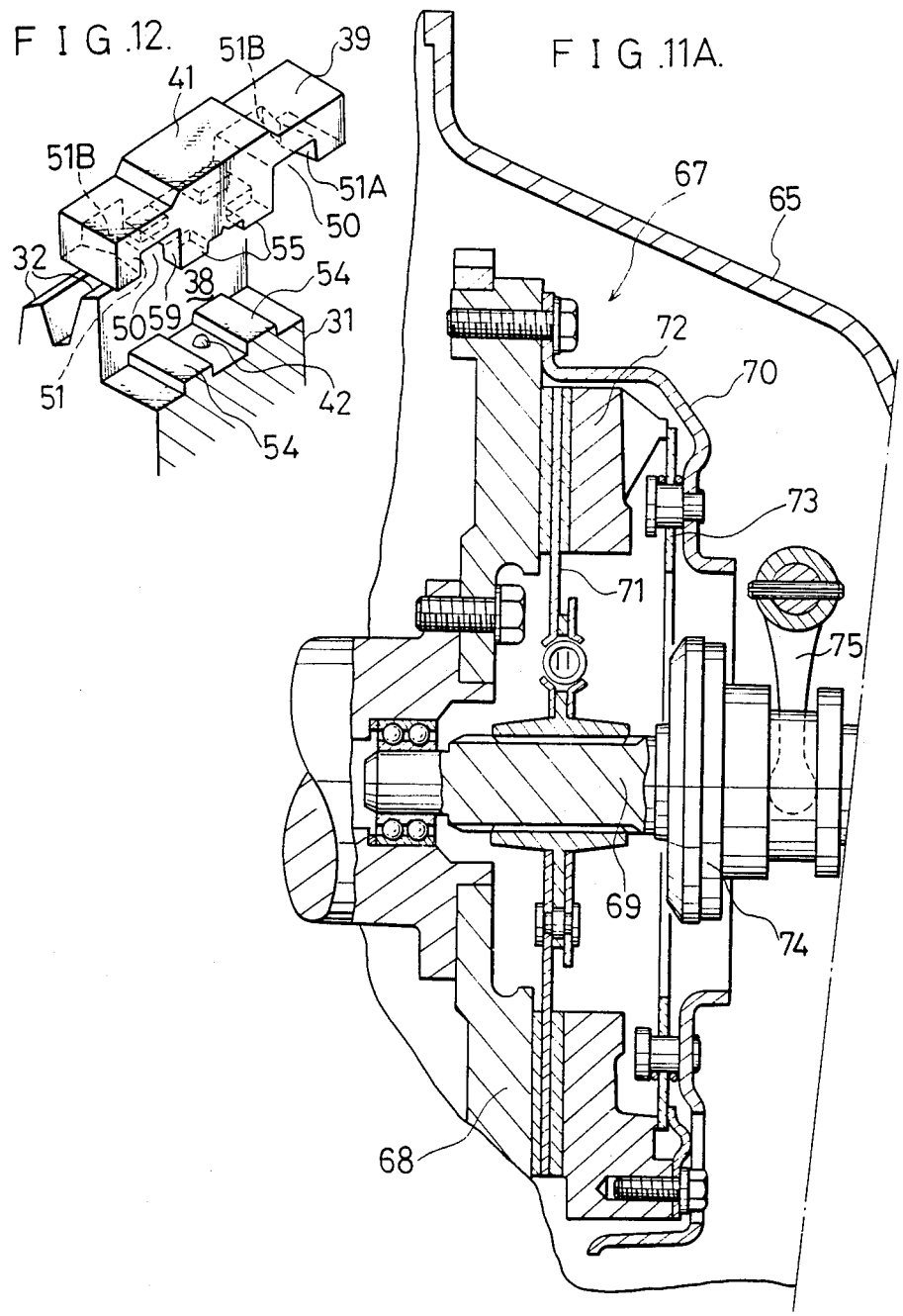

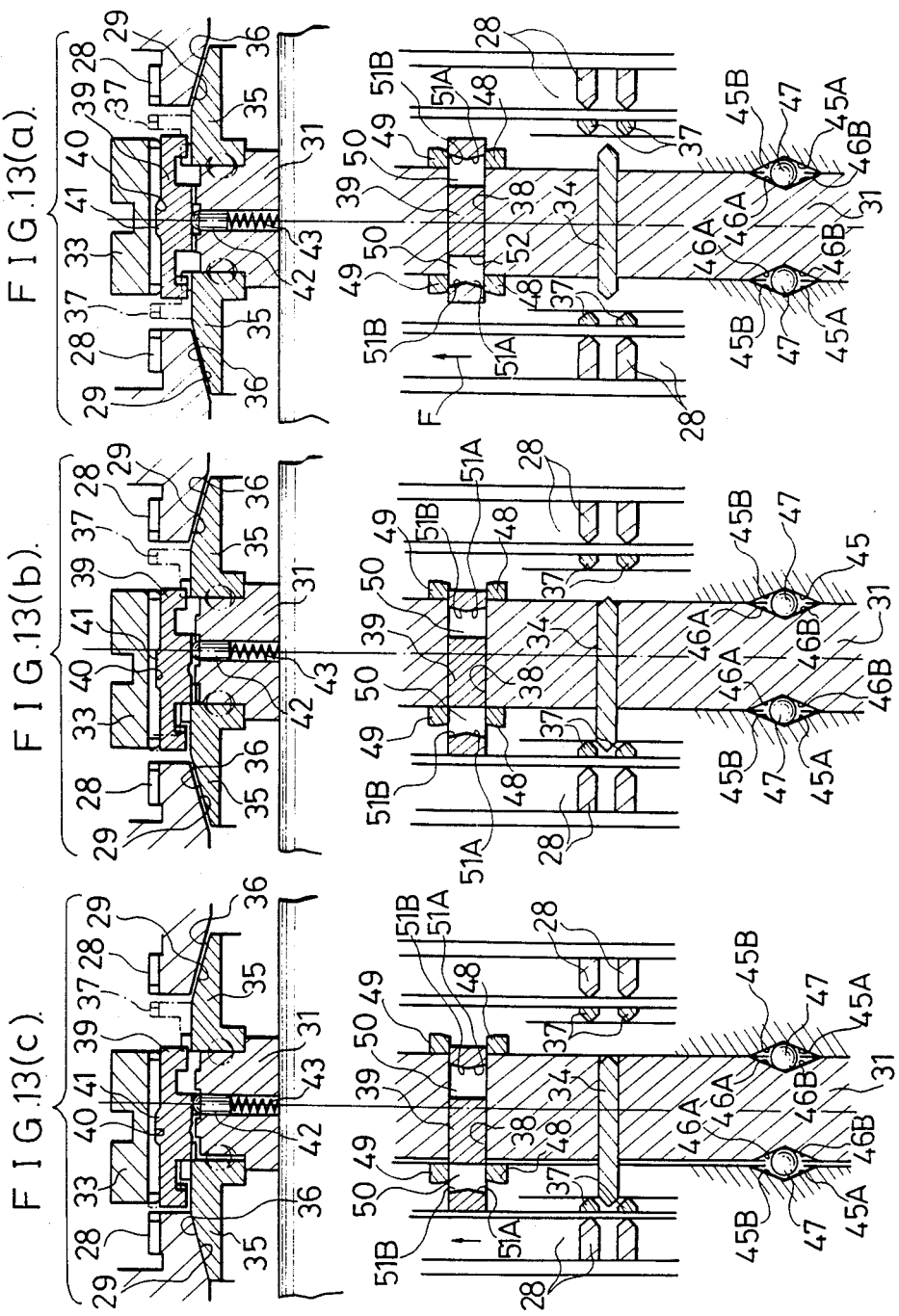

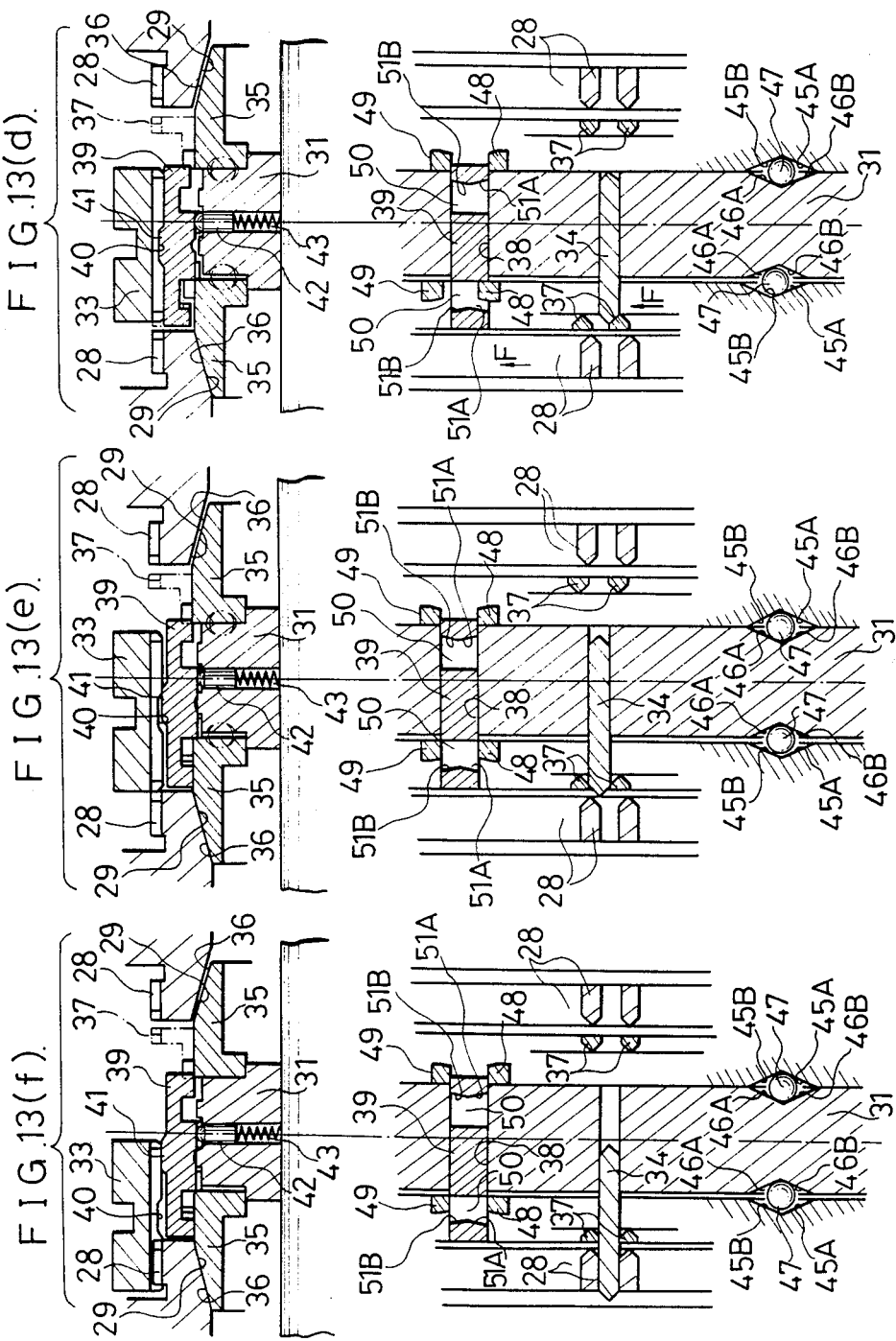

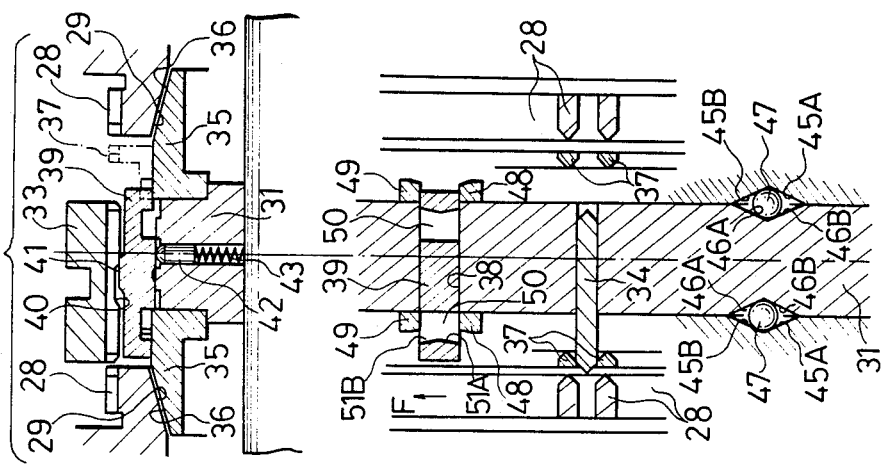
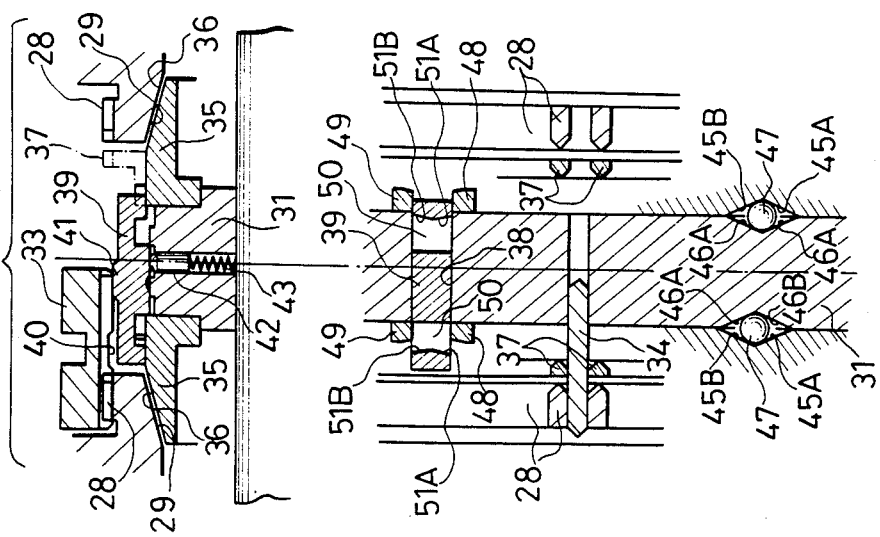

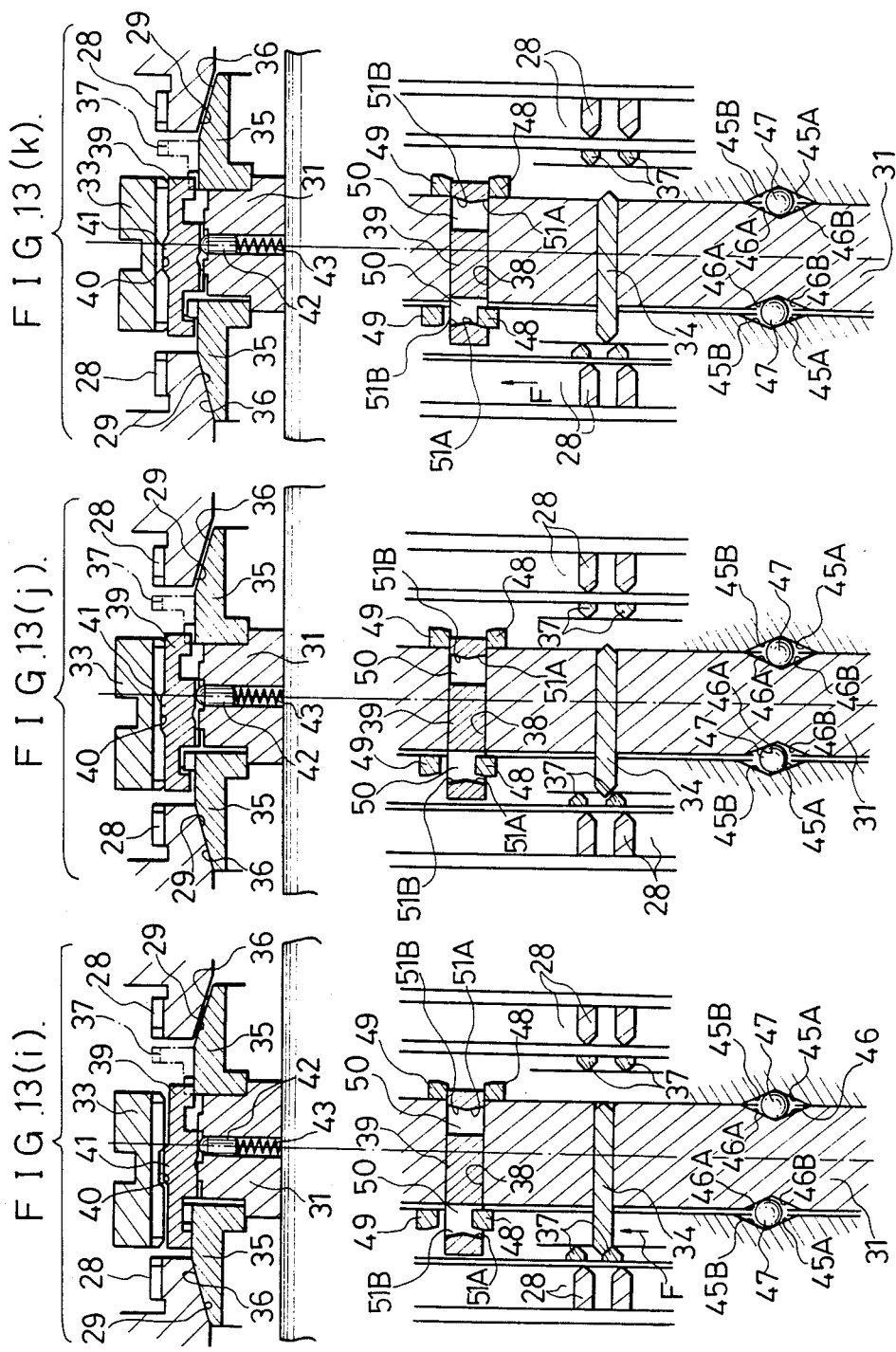

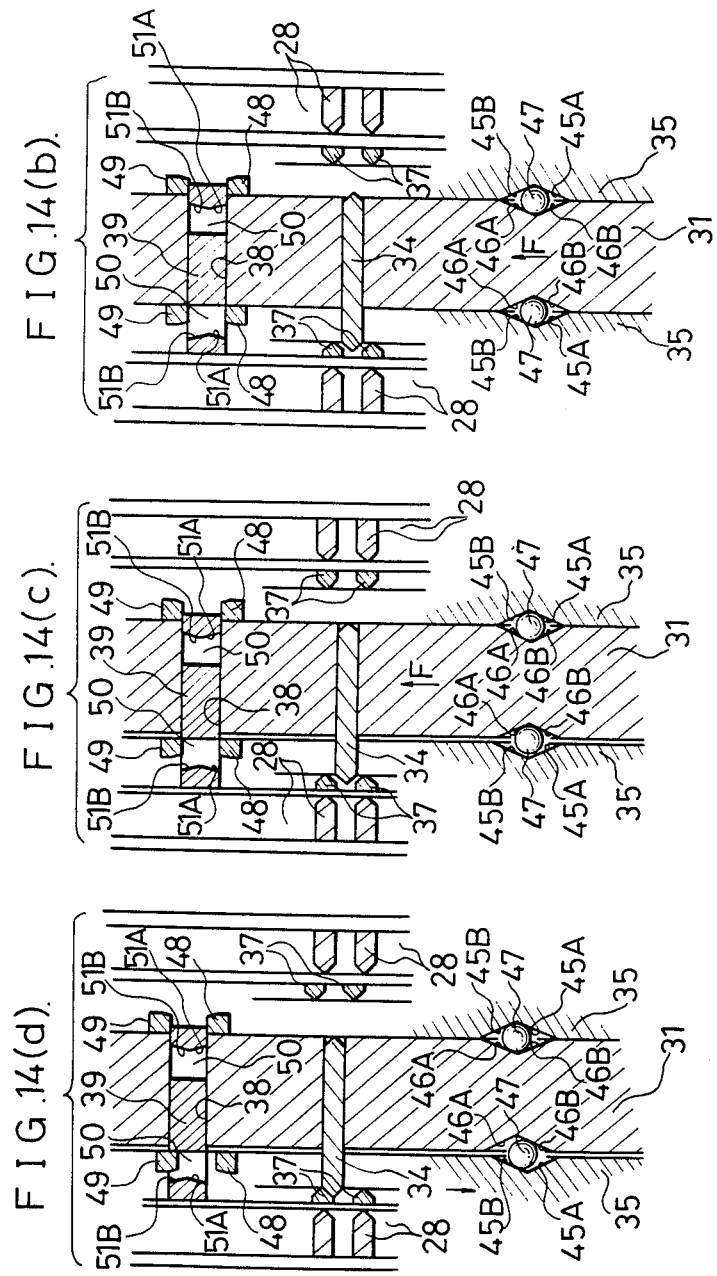

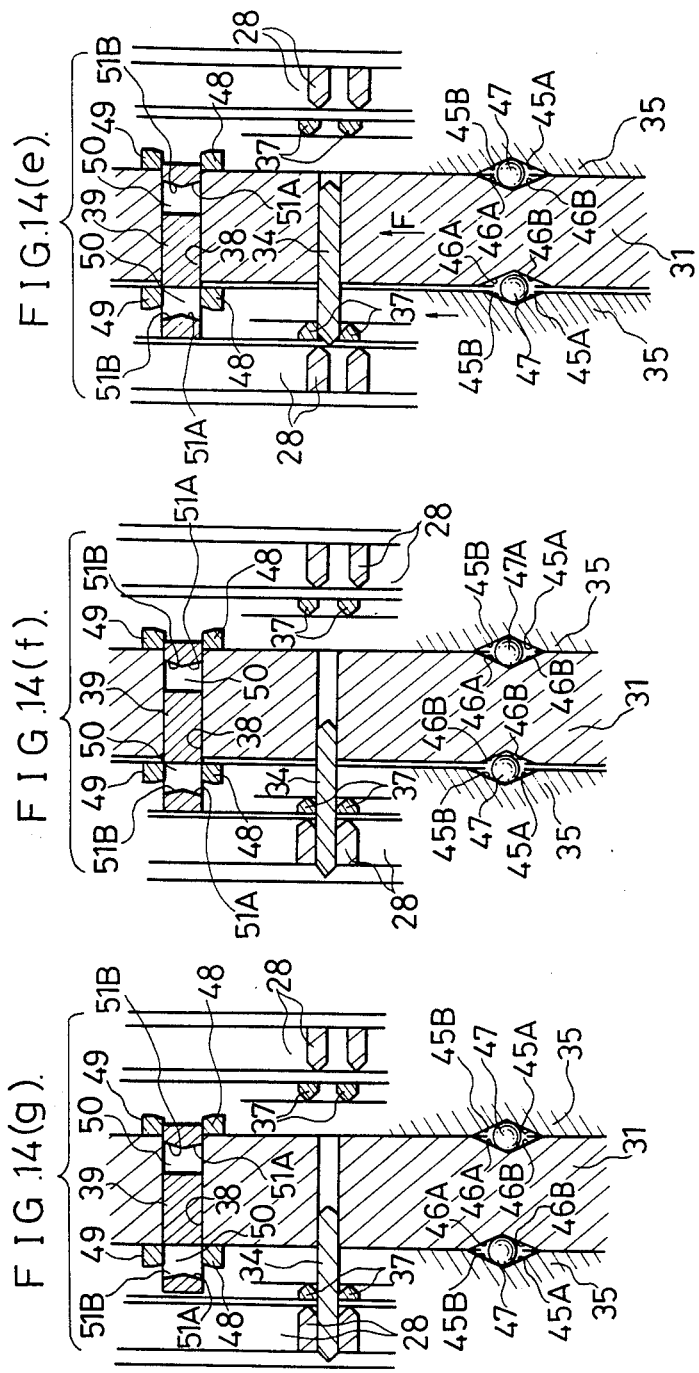

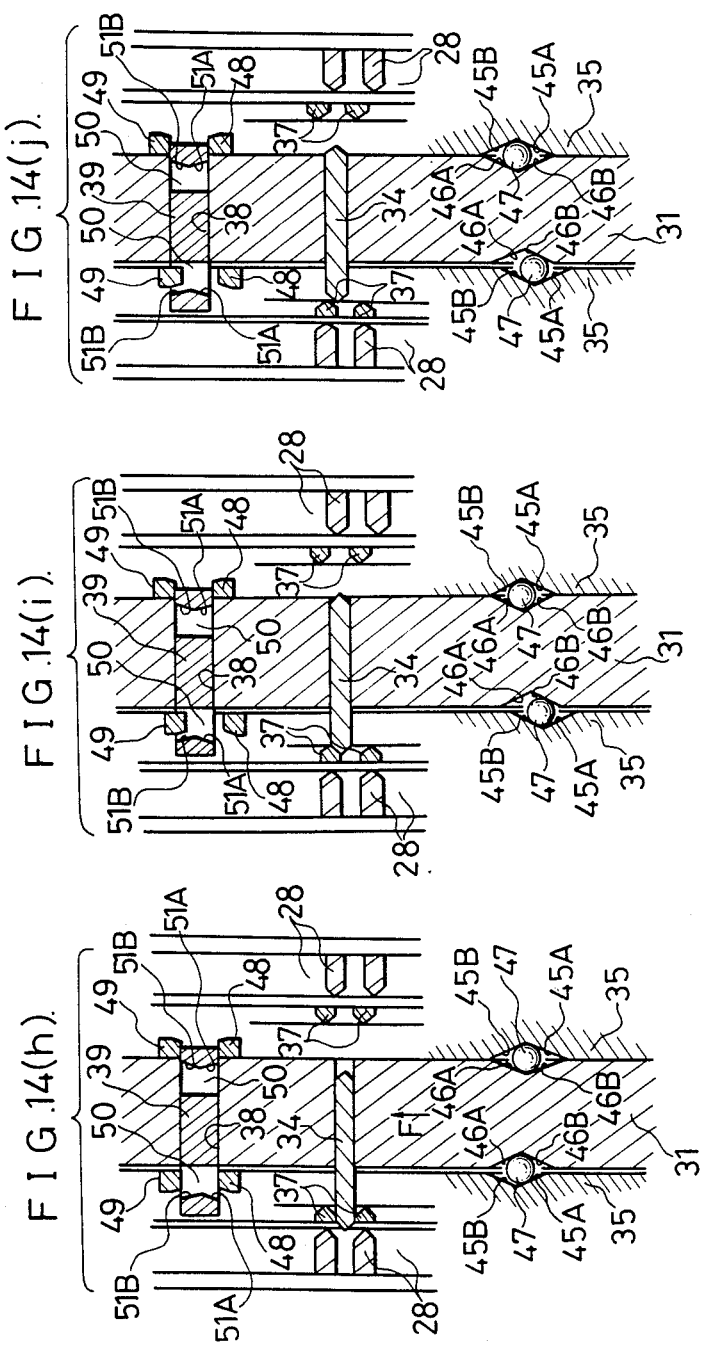

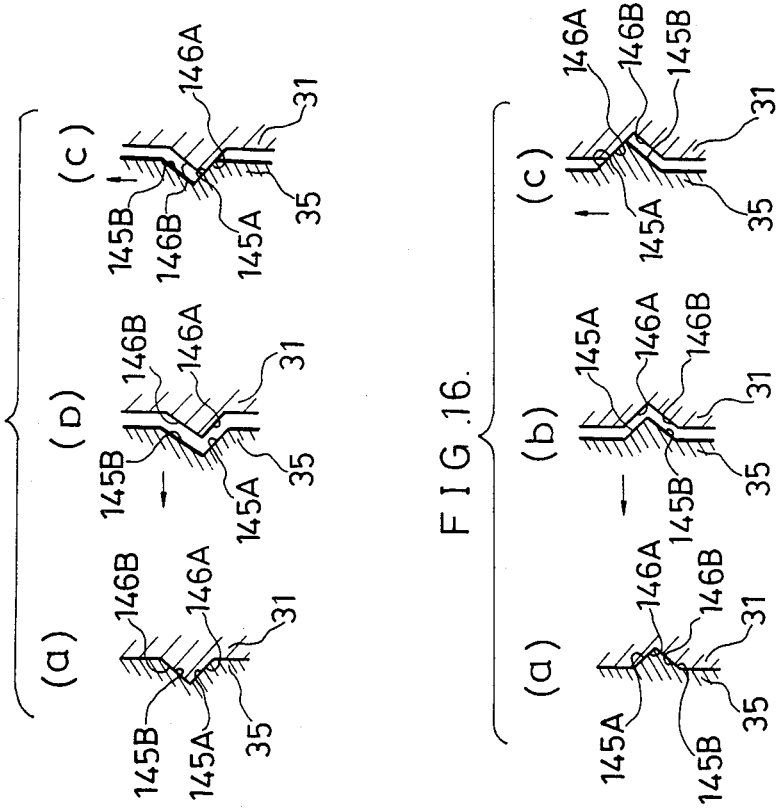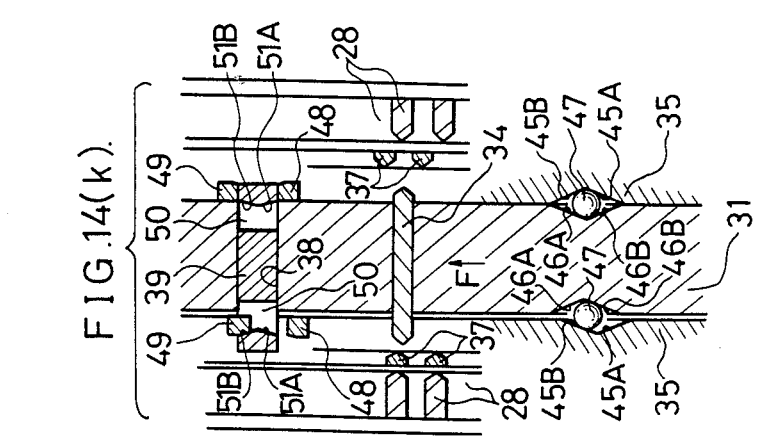

SYNCHRONIZING CLUTCH ASSEMBLY

FIELD OF THE INVENTION

This invention relates to a synchronizing clutch assembly adapted for use in marine reversing gear for boats such as yachts, motor boats, and fishing boats and for use in speed-change transmission for vehicles such as tractors and automobiles.

More particularly, the present invention relates to a novel synchronizing clutch assembly which belongs to the inertia lock-and key-type synchronizer clutch widely used in vehicles and which has a servo effect.

DESCRIPTION OF PRIOR ART

A marine reversing gear is used for the purpose of coupling forward direction gear and backward direction gear, which are rotatably mounted on an output shaft and are driven to rotate constantly by an engine, selectively to the output shaft which carries a propeller having a large inertial mass. Because of the large inertial mass carried by the output shaft, a cone clutch or a friction clutch of multi-disk type widely used in marine reversing gearing is apt to lose its life in a relatively short period of use due to wearing of clutch surfaces under a condition of use such that a boat needs to be repeatedly moved forwardly and backwardly to follow fish in shoals or such that a propeller is driven to rotate frequently at a low speed range where variation of torque is large.

In automobiles, an inertia lock-type synchronizer clutch is generally employed as a synchronizer clutch for overcoming drawbacks of a selective gear-type or constant mesh-type speed-change transmission that a differential between circumferential speed of a shift gear or coupler sleeve and that of a partner gear will cause a shock, when they are meshed or engaged with each other, which in turn may cause a noise and a damage and wearing of the gears. As the inertia lock-type synchronizer clutch for automobiles, the key-type (Borg Warner-type) clutch is generally employed. In special automobiles, such as sports cars, of the type which requires a quick speed-changing under a high speed condition, Porsche-type clutch is employed which is an inertial lock-type clutch having a servo effect.

Of these inertia lock-type clutches, the key-type clutch is typically fashioned such that a key member slidably received in a key-receiving groove of the outer circumference of a clutch hub is displaced using a synchronizer sleeve, mounted on the clutch hub slidably but non-rotatably by a splined connection, towards a synchronizer ring so as to thrust same against a clutch gear for causing frictional engagement between cone-shaped clutch surfaces of the synchronizer ring and clutch gear. Synchronous rotation is attained under a condition that displacement of the synchronizer sleeve towards clutch gear is restrained by an engagement of tapered end faces of splines on the inner circumference of synchronizer sleeve with tapered end faces of splines on the outer circumference of synchronizer ring. After the synchronous rotation of clutch hub and, therefore, synchronizer sleeve with the clutch gear has been attained, the synchronizer sleeve is displaced over the synchronizer ring so as to mesh splines of the sleeve with the clutch gear or splines thereof. It is thus seen that the key-type synchronizer clutch comprises a relatively small number of elements and movable members thereof perform almost only sliding movements so that the clutch operates in a reliable manner and has a large durability.

However, in a case where a large amount of energy is to be absorbed during a synchronizing process, even such key-type synchronizer clutch requires a large operating force and a prolonged time for synchronizing and is apt to generate noise. A large synchronizing capacity being capable of absorbing a large amount of energy will enlarge the size of clutch. In the case of marine reversing gearing, it is difficult even by the use of a large-scaled clutch to absorb a large amount of energy at the time when a propeller having a large inertial mass becomes rotated by a gear which is constantly driven to rotate by engine.

As well known, the Porsche-type synchronizer clutch employs a resilient synchronizer ring having a splitting groove. This synchronizer ring is compressed by a shifting operation of the synchronizer sleeve so that a frictional force is generated between mating surfaces of the sleeve and ring by the spring action of synchronizer ring. This frictional force is transmitted successively to a thrust block received in the splitting groove of synchronizer ring, a semi-circular, resilient brake band disposed in proximity to the inner surface of synchronizer ring, and a tiltable anchor block received in a recess, which is formed in the outher circumference of boss portion of the clutch, and is multiplied during such transmitting process. Large thrusting force urging the synchronizer ring to pressingly move towards the clutch gear is caused spontaneously so that synchronized rotation is achieved under a servo action or effect. It is thus seen that the required synchronous rotation is attained quickly even under a high speed condition of vehicle.

On the other hand, a Porsche-type clutch comprises a relatively large number of elements and movable members thereof perform complicated movements so that it is expensive and involves a problem with regard to maintenance. Either of the driving and driven sides of a synchronizer clutch employed in a speed-change transmission for vehicle may have a rotational speed higher than that of the other side before a speed-change operation which is performed under a condition where a main clutch is once released. From this, the Porsche-type synchronizer clutch employs two of the semi-circular brake bands referred to above so that either of them may participate in generating a braking torque. Consequently, only a half area of the clutch surfaces participate in the servo action so that synchronizing capacity of the clutch is limited of itself.

OBJECT

Accordingly, a primary object of the present invention is to provide a novel synchronizing clutch assembly which has the basic structure of intertia lock- and key-type synchronizer clutch, having been proved to be reliable in operation and large in durability, and in which a servo action is achieved at the whole area of conical clutch surfaces of the clutch and, nevertheless, an unexpected engagement of the clutch is prevented with certainty and also a clutch-disengaging operation is assured with certainty.

BRIEF DESCRIPTION OF THE DRAWINGS

In the drawings,

FIG. 7 is a perspective view, partially in section, showing a part of the clutch mechanism shown in FIG. 2 in a partially exploded condition;

FIG. 8 is a perspective view, partially in section, of the part of clutch mechanism shown in FIG. 7;

FIG. 9 is perspective view, partially in section, similar to FIG. 8 but showing a condition different from that shown in FIG. 8;

FIGS. 10(a) to 10(k) are illustrations for explaining operation of the first embodiment, wherein the upper side view of each of these figures depicts a longitudinal section of a half of the clutch mechanism shown in FIG. 2 whereas the lower side view of each of these figures depicts a section, taken along an imaginary cylindrical surface, of the part of clutch mechanism shown in the upper side view thereof;

FIGS. 11A and 11B are sectional side views, partially exploded, of a part of a tractor in which a second embodiment of the present invention is employed;

FIG. 12 is a perspective view, partially in section and partially exploded, of a part of a clutch mechanism shown in FIG. 11B;

FIGS. 13(a) to 13(k) are illustrations, for explaining operation of the second embodiment, similar to FIGS. 10(a) to 10(k);

Figure 2:
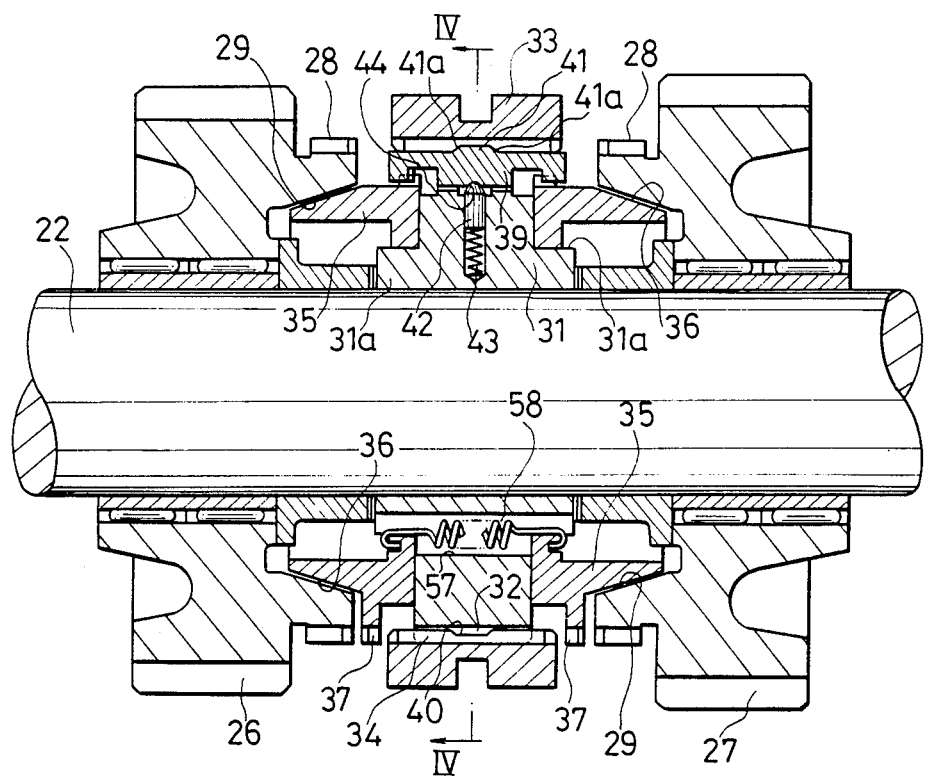
FIG. 2 is an enlarged sectional side view showing a part of FIG. 1.
Figure 17:
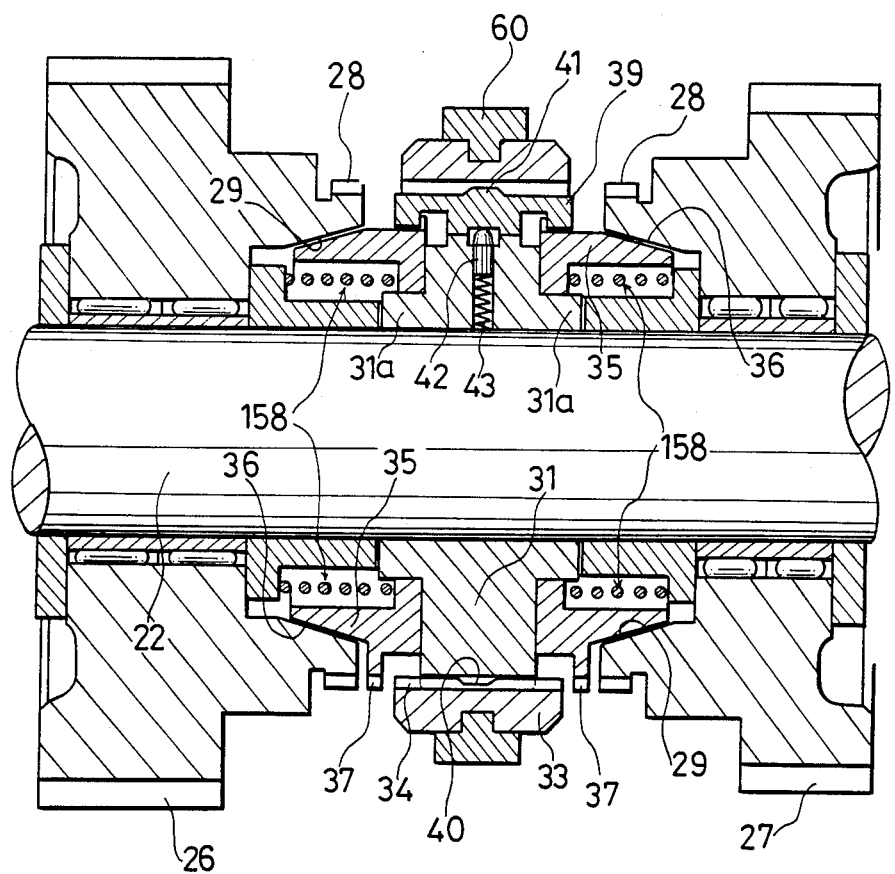

FIG. to 14(b) 14(k) are illustrations, also for explaining operation of the second embodiment, similar to the lower side views of FIGS. 13(b) to 13(k);

FIGS. 15(a), (b) and (c) and FIGS. 16 (a), (b) and (c) are sectional views, showing respectively one and another alternatives of a cam means employed in the second embodiment shown in FIGS. 11 to 14; and FIG. 17 is a sectional side view similar to FIG. 2, but showing an alternative of return spring means shown in FIG. 2.

SUMMARY OF THE INVENTION

The present invention starts from the basic structure which is employed in a typical inertia lock- and key-type synchronizer clutch.

The present invention thus relates to a synchronizer clutch assembly which comprises, as shown respectively in FIGS. 1 to 10 and in FIGS. 11A to 14, a transmission shaft 22 (FIGS. 1 to 4) or 77 (FIGS. 11A and 11B); a drive gear 26, 27 (FIGS. 1 and 2) or 76, 84, 85, 86 (FIG. 11B) mounted rotatably on the transmission shaft and having an integral clutch gear 28 which in turn has at an inner circumference thereof a cone-shaped first clutch surface 29; a hub member 31 mounted fixedly on the transmission shaft and having at an outer circumference thereof first splines 32; an axially shiftable sleeve member 33 having at an inner circumference thereof second splines 34, which are engageable with the clutch gear 28, and mounted on the transmission shaft slidably but non-rotatably by a splined connection between the first and second splines 32 and 34; a synchronizer ring 35 mounted slidably on a diameter-reduced end portion 31a of the hub member 31 and having at an outer circumference thereof a cone-shaped second clutch surface 36, which is engageable frictionally with the first clutch surface 29, and third splines 37 which may mesh with the second splines 34; and a key member 39 received slidably in a key-receiving axial groove 38, which is formed in the outer circumference of hub member 31, and being operable to thrust the synchronizer ring 35, when moved towards such ring, so as to cause a frictional engagement between the first and second clutch surfaces 29 and 36. The key member 39 has at an outer surface thereof a projection 41, which is adapted to be received in an annular recess 40 formed in the inner circumference of sleeve member 33, and is biased to move radially outwardly of the hub member 31 so as to engage at the projection 41 with the sleeve member 33 co-slidably so that, when the sleeve member 33 is shifted from a neutral position towards the clutch gear 28, the key member 39 is moved towards the synchronizer ring 35.

In the structure set forth above, when the sleeve member 33 is shifted towards the clutch gear 28 so as to move the key member 39 towards the synchronizer ring 35 and so as to thereby thrust the ring by the key member an initial engagement is caused between the first and second clutch surfaces 29 and 36. According to the present invention, cam means is provided for attaining a servo action by which engagement between the first and second clutch surfaces 29 and 36 is enhanced spontaneously and quickly after the initial engagement referred to above has been caused.

Such cam means is disposed between opposite end faces of the synchronizer ring 35 and hub member 31 and is fashioned such that it includes in the end faces set forth above ramp surfaces oblique relative to a rotational direction of the clutch gear 28 and operable by a rotational displacement of the synchronizer ring 35 relative to the hub member 31, which displacement is caused as a result of a frictional engagement between the first and second clutch surfaces 29 and 36, to cause an engagement of the synchronizer ring 35 with the hub member 31 in the rotational direction of clutch gear 28 and to force the synchronizer ring 35 to move towards the clutch gear 28.

Such cam means may be fashioned, as shown respectively in FIG. 15 and in FIG. 16, to include ramp surfaces 145A, 146A or 145B, 146B which are engaged directly with each other as a result of a rotational displacement of the synchronizer ring 35 relative to the hub member 31. However, for a purpose of avoiding an increase of resistivity against a sliding displacement of the synchronizer ring 35 by such cam means, it is preferred to form in the opposite end faces of the synchronizer ring 35 and hub member 31, as shown respectively in the lower side view of FIG. 10(a) and in the lower side view of FIG. 13(a), cam grooves having bottom ramp surfaces 45, 46 or 45A, 46A, 45B, 46B which cooperate through a ball 47 disposed within the cam grooves.

Cam means set forth above, which is operated by a relative rotational displacement between the synchronizer ring 35 and hub member 31 caused as a result of a frictional engagement between the first clutch surface 29 of clutch gear 28 and the second clutch surface 36 of synchronizer ring 35, will enhance thrusting force applied to the synchronizer ring 35 as the frictional engagement between the clutch surfaces 29 and 36 becomes enhanced by such thrusting force itself so that rotational speed of the synchronizer ring 35 becomes closer to that of the clutch gear 28 and, therefore, the synchronizer ring is rotationally displaced further relative to the hub member 31. It is thus seen that frictional engagement between the first and second clutch surfaces 29 and 36 will proceed under a servo action.

For preventing an unexpected engagement of the clutch mechanism due to such servo action with certainty and for assuring a reliable clutch-disengaging operation not affected by such servo action, mechanisms which will be detailed hereinafter are provided according to the present invention.

As shown respectively in FIG. 10(a) and in FIG. 13(a), stopper means 48, 49 is provided on the outer circumference of synchronizer ring 35 for preventing an unexpected engagement of the clutch such that, when the sleeve member 33 is in its neutral position, the stopper means engages the key member 39 so as to prevent a rotational displacement of the synchronizer ring, whereas a recess 50 is formed in an inner surface of the key member 39 such that, when the key member is displaced from a neutral position thereof slightly towards the clutch gear 28, the recess releases the stopper means 48, 49 from the engagement with the key member 39 so as to permit a rotational displacement of the synchronizer ring 35.

The stopper means 48, 49 set forth above prevents, when the sleeve member 33 is placed in its neutral position, a rotational displacement of the synchronizer ring 35 by which displacement the cam means referred to before may become operative so as to cause an engagement of the second clutch surface 36 with the first clutch surface 29. The recess 50 set forth above will function, when the key member 30 is moved by a shifting operation of the sleeve member 33 for engaging the clutch mechanism, to permit a rotational displacement of the synchronizer ring 35 so that the clutch mechanism may be engaged, as required, notwithstanding the presence of stopper means 48, 49. As the stopper means set forth above, there are preferably provided according to the present invention a first stopper projection 48, which engages the key member 39 at the neutral position of sleeve member 33 from one circumferential direction of the synchronizer ring 35, and a second stopper projection 49 which engages the key member 39 at the neutral position of sleeve member from the other circumferential direction of the synchronizer ring.

For assuring a reliable clutch-disengaging operation, a ramp surface 51 or 51A, 51B is formed as shown respectively in FIG. 10(k) and in FIGS. 13(k) and 14(k) on one of inner end faces of the recess 50 set forth above, which is positioned nearer to the clutch gear 28 than the other inner end face, such that when the key member 39 is displaced axially away from the clutch gear 28 in a condition where the stopper means 48, 49 is located within the recess 50, such ramp surface 51 (FIG. 10(k)) or 51A, 51B (FIGS. 13(k) and 14(k)) pushes the stopper means 48, 49 so as to rotate the synchronizer ring 35 towards a direction of moving the stopper means out of the recess 50.

As will be detailed later, on the way of a disengaging operation of the clutch mechanism shown having a servo effect a re-engagement between the first and second clutch surfaces 29 and 36 may be caused spontaneously with ease. Even when such re-engagement of the clutch surfaces is caused, the ramp surface 51 or 51A, 51B set forth above will assure a reliable clutch-disengaging operation as will be detailed later.

The synchronizing clutch assembly according to the present invention may be designed either to a single-acting clutch mechanism for coupling a single drive gear, mounted rotatably on a transmission shaft at one side of the clutch, to the shaft or to a double-acting clutch mechanism for coupling selectively a pair of drive gears, mounted rotatably on a transmission shaft at one and the other sides of the clutch, to the shaft.

In a double-acting clutch mechanism in which there are provided respectively a pair of the clutch gears and a pair of the synchronizer rings, first and second stopper projections 48 and 49 constituting the stopper means referred to before are provided according to the present invention on the synchronizer rings 35 of both sides such that, as shown respectively in FIG. 10(f) and in FIGS. 13(f) and 14(f), even at a condition where the key member 39 is located at a position closest to clutch gear 28 of one side an end portion of the key member still remains between the first and second stopper projections 48 and 49 on the synchronizer ring 35 of the other side. Further, in a double-acting clutch mechanism according to the present invention, the hub member 31 is provided at a bottom surface of the key-receiving groove 38 thereof with range-limiting portions or protrusions 54, shown respectively in FIGS. 7 to 9 and in FIG. 12, which limit the axial sliding movement of key member 39 within a predetermined range at a condition where the key member 39 is pushed down by the shifter sleeve 33 within the groove 38 radially inwardly of the hub member.

The clutch assembly according to the present invention achieves a synchronous rotation between the clutch gear 28 and sleeve member 33 in a manner which will be detailed hereinafter.

When sleeve member 33 is shifted from its neutral position so that key member 39 is moved together with the sleeve member, the key member will permit a rotational displacement of the synchronizer ring 35 and also will thrust the synchronizer ring to cause an engagement of the clutch surface 36 thereof with the clutch surface 29 of clutch gear 28. Once an initial engagement between the clutch surfaces 29 and 36 has been caused, synchronizer ring 35 becomes dragged by the clutch gear 28 so that the synchronizer ring is displaced rotationally relative to the hub member 31. Consequently, synchronizer ring 35 is urged towards the clutch gear by cam means disposed between the opposite end faces of synchronizer ring 35 and hub member 31 and thus, as already described before, engagement between the clutch surfaces 29 and 36 becomes enhanced spontaneously by a servo action so that a fully engaged condition of the clutch surfaces is achieved with ease and quickly. The cam means referred to above also causes an engagement of the synchronizer ring 35 with hub member 31 in the rotational direction of clutch gear 28 so that the synchronizer ring 35 and hub member 31 rotate together towards the rotational direction of clutch gear 28. Consequently, when the clutch surfaces 29 and 36 have been fully engaged, the clutch gear 28, synchronizer ring 35 and hub member 31 rotate synchronously so that a synchronized condition is attained in which the circumferential speed of the sleeve member 33 rotating in unison with the hub member 31 is equalized with that of the clutch gear 28.

As is the case in the conventional inertia lock- and key-type synchronizer clutch, such synchronizing process proceeds under a condition where the sleeve member 33 is restrained from a sliding movement towards the clutch gear 28 by an engagement of the axial end faces of splines 34 of the sleeve member with the axial end faces of splines 37 of the synchronizer ring 35. Synchronizing process under a servo action proceeds at the whole area of the conical clutch surfaces 29 and 36, so that a clutch assembly according to the present invention may have a large synchronizing capacity. A small-scaled clutch may be used satisfactorily as a marine reversing clutch which is required to absorb a large amount of energy generated at the clutch when a propeller having a large inertial mass becomes rotated.

After a synchronized condition has been attained, splines 34 of the sleeve member 33 may be meshed with splines 37 of the synchronizer ring 35 as is the case in the conventional inertia lock-type synchronizer clutch. When the splines 34 and 37 have been meshed together so that the synchronizer ring 35 and sleeve member 33 and, therefore, hub member 31 are coupled co-rotatably through meshing splines, cam means disposed between opposite end faces of the synchronizer ring 35 and hub member 31 operates no more. Thereafter, by an operating force succeedingly applied to the sleeve member 33, splines 34 of such sleeve member come into engagement with the clutch gear 28 or splines thereof with ease, as is also the case in the conventional inertia lock-type synchronizer clutch.

During a clutch-disengaging operation which is performed by shifting the sleeve member 33 away from clutch gear 28, a rotation of the synchronizer ring 35 dragged by the clutch gear 28 may be caused when splines 34 of the sleeve member 33 have been released, as shown respectively in FIG. 10(i) and in FIGS. 13(i) and 14(i), from splines 37 of the synchronizer ring 35 and either when any contact of the synchronizer ring with clutch gear 28 occurs or when there exists a lot of lubricant, sludge or the like between the clutch gear 28 and synchronizer ring 35. As a result of such dragged rotation of synchronizer ring 35 a rotational displacement of the synchronizer ring 35 relative to the hub member 31 is caused so that the cam means set forth before may operate to cause a re-engagement of the clutch surfaces 29 and 36, as also shown respectively in FIG. 10(i) and in FIGS. 13(i) and 14(i). However, the rotational displacement of synchronizer ring 35 referred to above will bring the stopper means or one of the projections 48 and 49 of the ring 35 into the recess 50 of key member 39. Consequently, after a condition where the key member 39 is moved towards its neutral position together with sleeve member 33 has been attained by a further shifting operation of the sleeve member, the inner end ramp surface 51, 51A or 51B of the recess 50 of key member 39 pushes the projection 48 or 49, as shown respectively in FIG. 10(k) and in FIGS. 13(k) and 14(k), so that the synchronizer ring 35 is displaced rotationally towards a direction of moving the projection 48 or 49 out of the recess 50. Such rotational displacement of the synchronizer ring 35 will disactuate the operation of cam means disposed between the synchronizer ring 35 and hub member 31. And, the synchronizer ring 35 is forcibly moved away from clutch gear 28 so that the clutch mechanism becomes disengaged with certainty.

An unexpected engagement of the clutch mechanism from the neutral condition thereof is prevented with certainty by a cooperation of the key member 39 and stopper means 48, 49, as already described before.

The previously described arrangement of first and second stopper projections 48 and 49 of a pair of axially spaced synchronizer rings 35 in a double-acting mechanism, such that an end portion of the key member 39 still remains between the projections 48 and 49 of one side even at a condition where such key member is displaced maximumly towards the other side, contributes to prevent an unexpected engagement of the clutch mechanism of one side with certainty when the clutch mechanism of the other side is being operated and also when such clutch mechanism is in an engaged condition.

During a clutch-disengaging process of the clutch mechanism of one side in a double-acting clutch assembly, the range-limiting portions or protrusions 54 shown respectively in FIGS. 7 to 9 and in FIG. 12 and referred to before restrains the key member 39 from a sliding movement towards synchronizer ring 35 of the other side, which movement may be caused due to a frictional force acting between the sleeve member 33 and key member 39, so that an unexpected engagement of the clutch mechanism due to such sliding movement of the key member 39 is prevented with certainty. Further, owing to such range-limiting portions or protrusions 54, the projection 41 of key member 39 becomes fitted into the annular recess 40 of sleeve member 33 at a predetermined axial position of the sleeve member. Such fitting of the projection 41 into the annular recess 40 is attained when the key member 39 is moved radially outwardly by a biasing force applied thereto. In the clutch assembly shown, such biasing force is provided by a spring 43 of a latch mechanism for keeping a neutral condition of the clutch assembly. Alternatively, a ring-shaped spring employed in the conventional key-type synchronizer clutch may be used as a biasing means for the key member.

The clutch assembly shown in FIGS. 1 to 10 is designed for use in a marine reversing gear in which when the clutch mechanism is operated the driving side thereof necessarily has a rotational speed higher than that of the driven side of clutch mechanism. From this, cam means disposed between the synchronizer ring 35 and hub member 31 is provided with only a pair of the ramp surfaces 45 and 46 and the key member 39 is provided at one of the inner end faces of the recess 50 with only one of the ramp surface 51. Contrarily, the clutch assembly shown in FIGS. 11B to 14 is designed for use in a speed-change transmission for vehicles in which either the driving and driven sides of the clutch mechanism may have a rotational speed higher than that of the other side after a main clutch has been released for a speed-changing purpose. From this, cam means disposed between the synchronizer ring 35 and hub member 31 is provided with two pairs of the ramp surfaces 45A, 46A and 45B, 46B and the key member 39 is provided with a pair of the ramp surfaces 51A and 51B.

The clutch assembly shown in FIGS. 11B to 14 may be used also in a marine reversing gear or the like in which the clutch assembly shown in FIGS. 1 to 10 is intended to use. However, the structure shown in FIGS. 1 to 10 is preferred because the single ramp surface 51 of key member 39 permits to design the clutch such that a relatively large rotational displacement of the synchronizer ring 35 relative to the hub member 31 is given for permitting a relatively large axial displacement of the synchronizer ring 35. A larger axial displacement of the synchronizer ring allows to enlarge the axial interval between the first and second clutch surfaces 29 and 36 at the neutral condition of clutch mechanism so as to avoid unnecessary contact between such clutch surfaces. The structure shown in FIGS. 1 to 10 is also advantageous because it permits an easier machining of the clutch elements.

According to the present invention, a synchronizing clutch assembly is provided which has a large synchronizing capacity owing to a servo action at the whole area of the conical clutch surfaces 29 and 36 of clutch gear 28 and synchronizer ring 35. A synchronous rotation may be attained with a relatively small operating force, in a relatively short time, and without causing any substantial noise. Contrarily to the case of conventional cone clutch widely used in marine reversing gear, conical clutch surfaces 29 and 36 of the clutch assembly according to the present invention are utilized only for a rotation-synchronizing purpose so that wearing of the clutch surfaces is much reduced as compared to the conventional cone clutch. Even when some wearing of such clutch surfaces has been caused, some additional time is merely required for a clutch-engaging process and no problem is caused in transmission of torque which is made under a condition where splines of the sleeve member 33 are engaged with clutch gear 28.

Nevertheless, an unexpected engagement of the clutch mechanism from the neutral condition thereof is prevented with certainty by a cooperation of the key member 39 and stopper means 48, 49 of the synchronizer ring 35. And, although a re-engagement between the clutch surfaces 29 and 36 may be caused during a clutch-disengaging process, a clutch-disengaging operation is assured, even when such re-engagement has been caused, by the ramp surface 51 or 51A, 51B of key member 39. It is thus seen that problems arising from the servo action or effect are successfully solved according to the present invention.

The synchronizing clutch assembly according to the present invention has the basic structure of inertia lock- and key-type synchronizer clutch which has been proved to be reliable in operation and large durability. Starting from such basic structure, the present invention provides cam means additionally between the synchronizer ring 35 and hub member 31, for achieving a servo action, and some additional structures to the key member 39 and synchronizer ring 35 for solving two problems arising from the servo action. Consequently, the present invention provides successfully a clutch assembly which has advantages of the conventional key-type synchronizer clutch almost as they are. That is, the clutch assembly according to the present invention is simple in structure and may be manufactured with a low cost, operates in a reliable manner, and has a large durability.

In the case of double-acting clutch assembly, it is preferred that the key member 39 is formed to have a T-shaped configuration including a depending leg portion, which extends from an axial mid portion of the key member radially inwardly of hub member 31, and a pair of axial extensions which extend towards the synchronizer rings 35. One and the other axial end faces of the leg portion set forth above are utilized as a pair of thrusting surfaces 59 for thrusting the synchronizer rings 35 of respective sides. Each of the recess 50 for permitting a rotational displacement of each synchronizer ring 35 is formed in an inner surface of each of the axial extensions set forth above.

According to the structure of key member referred to above, the key member may be received stably at the leg portion thereof in the key-receiving groove 38 of hub member 31. Each of the thrusting surfaces 59 set forth above acts directly upon an end face of each synchronizer ring 35 so that an additional projection to be thrusted by the key member is not required on the outer surface of synchronizer ring 35. Consequently, positioning of the two projections 48 and 49 on the outer surface of synchronizer ring 35 relative to the recess 50 of key member 39 may be made with ease. Further, axial length of the key member 39 may be secured with ease so that it remains at an end portion thereof between projections 48 and 49 of the synchronizer ring 35 of one side even when the key member is displaced maximumly towards the other side.

DESCRIPTION OF PREFERRED EMBODIMENTS

Figure 1:
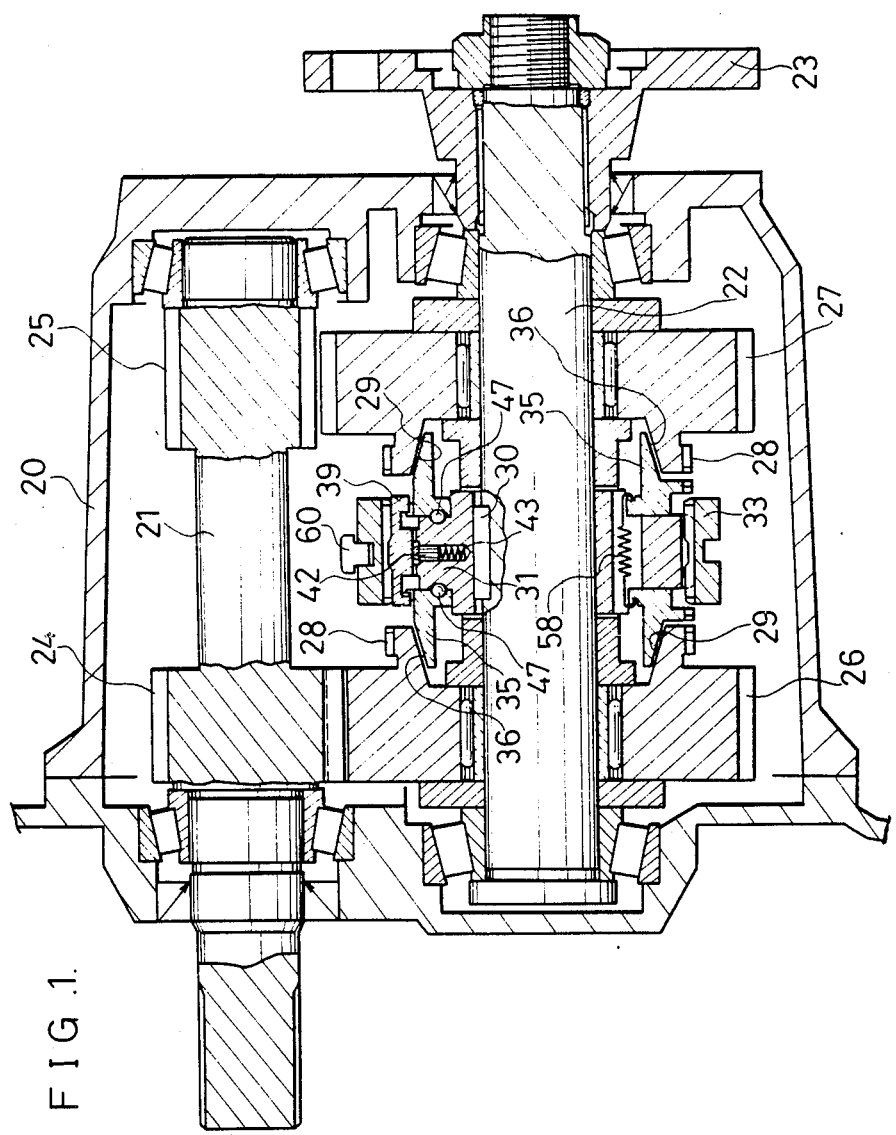
FIG. 1 is a sectional side view of a marine reversing gear in which a first embodiment of the synchronizer clutch assembly according to the present invention is employed.

FIGS. 1 to 10 depict a first preferred embodiment of the present invention which is employed in a marine reversing gear shown in FIG. 1.

In FIG. 1, numeral 20 designates a gear casing which is mounted in a stern portion of a boat (not shown) such as a yacht, motor boat or fishing boat. In the casing 20 is journalled an input shaft 21, extending forwardly from the casing, and an output shaft 22 extending backwardly from the casing. The input shaft 21 is connected at its front end to an engine fly wheel through a damper coupling (both not shown), whereas the output shaft 22 is connected at its rear end to a propeller shaft (not shown) through a coupling which includes a coupling half 23 shown.

Within the gear casing 20, the input shaft 21 carries thereon an integral forward direction gear 24 and backward direction gear 25 which are spaced axially of the shaft 21. On the output shaft 22 are rotatably mounted through bearing means a larger forward direction gear 26, meshing with the gear 24, and a larger backward direction gear 27 meshing with an intermediate gear (not shown) which in turn meshes with the smaller backward direction gear 25 on the input shaft. Consequently, each of these gears 26 and 27 on the output shaft constitutes a drive gear which drives the shaft 22 to rotate when coupled to such shaft.

As shown in FIGS. 1 and 2, each of such drive gears 26 and 27 is formed with an integral clutch gear 28 having a smaller diameter and a smaller axial width. Each of these clutch gears 28 has at the inner circumference thereof a cone-shaped first clutch surface 29. As shown in FIGS. 1 to 4, a hub member 31 is disposed at a mid location between the gears 26 and 27 and is fixedly mounted on the output shaft 22 using a pair of keys 30. This hub member 31 has at its outer circumference splines 32, as shown in FIGS. 5 to 9. On the hub member 31 is slidably mounted an axially shiftable sleeve member 33 having at its inner circumference splines 34 (see FIGS. 5 and 6) which may be engaged with each of the clutch gears 28. Sleeve member 33 is connected non-rotatably to the hub member 31 through an engagement between splines 32 and 34. Hub member 31 includes a pair of diameter-reduced end portion 31a on which a pair of synchronizer rings 35 are slidably mounted. Each of these rings 35 has at its outer circumference a cone-shaped second clutch surface 36, which may be engaged frictionally with the first clutch surface 29 of each clutch gear 28, and splines 37 with which splines 34 of the sleeve member 33 may be meshed. In the outer circumference of the hub member 31 are formed circumferentially spaced three axial grooves 38 in which key members 39 are slidably received, respectively. Clutch elements having been detailed hereinbefore are illustrated somewhat schematically in FIG. 5 in an exploded condition.

Figure 4:
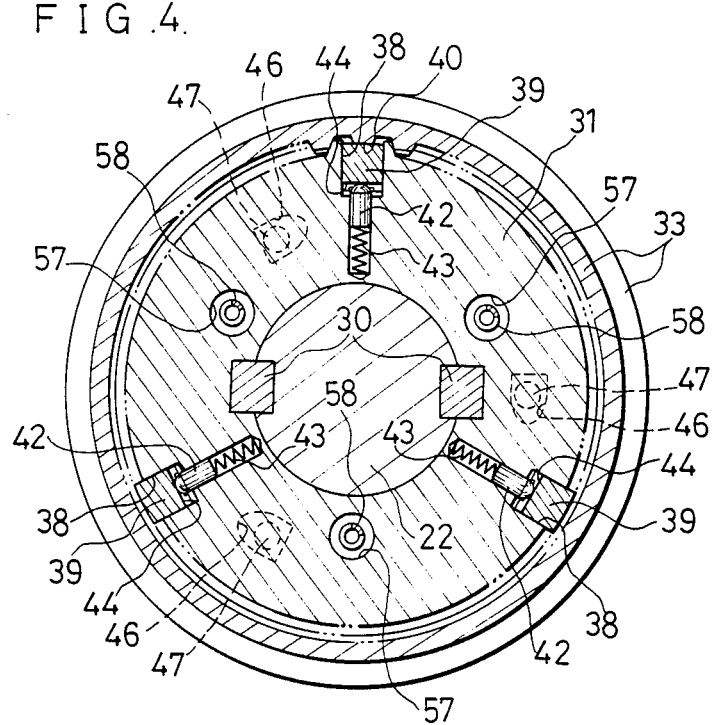
FIG. 4 is a cross-sectional view taken along line IV—IV of FIG. 2.
Figure 6:
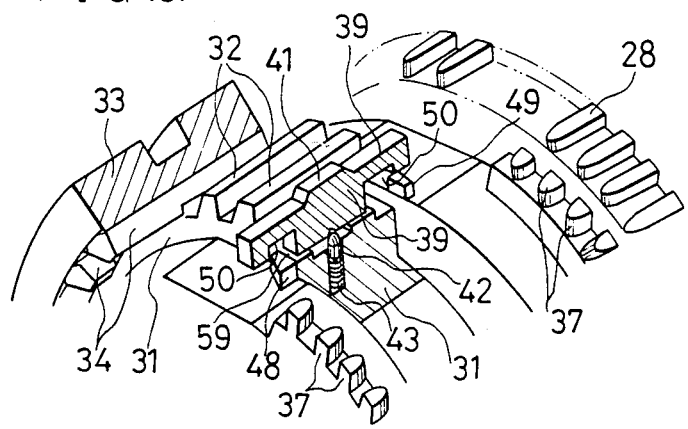
FIG. 6 is a perspective view, partially in section, of a part of the clutch mechanism shown in FIG. 2.
Figure 5:
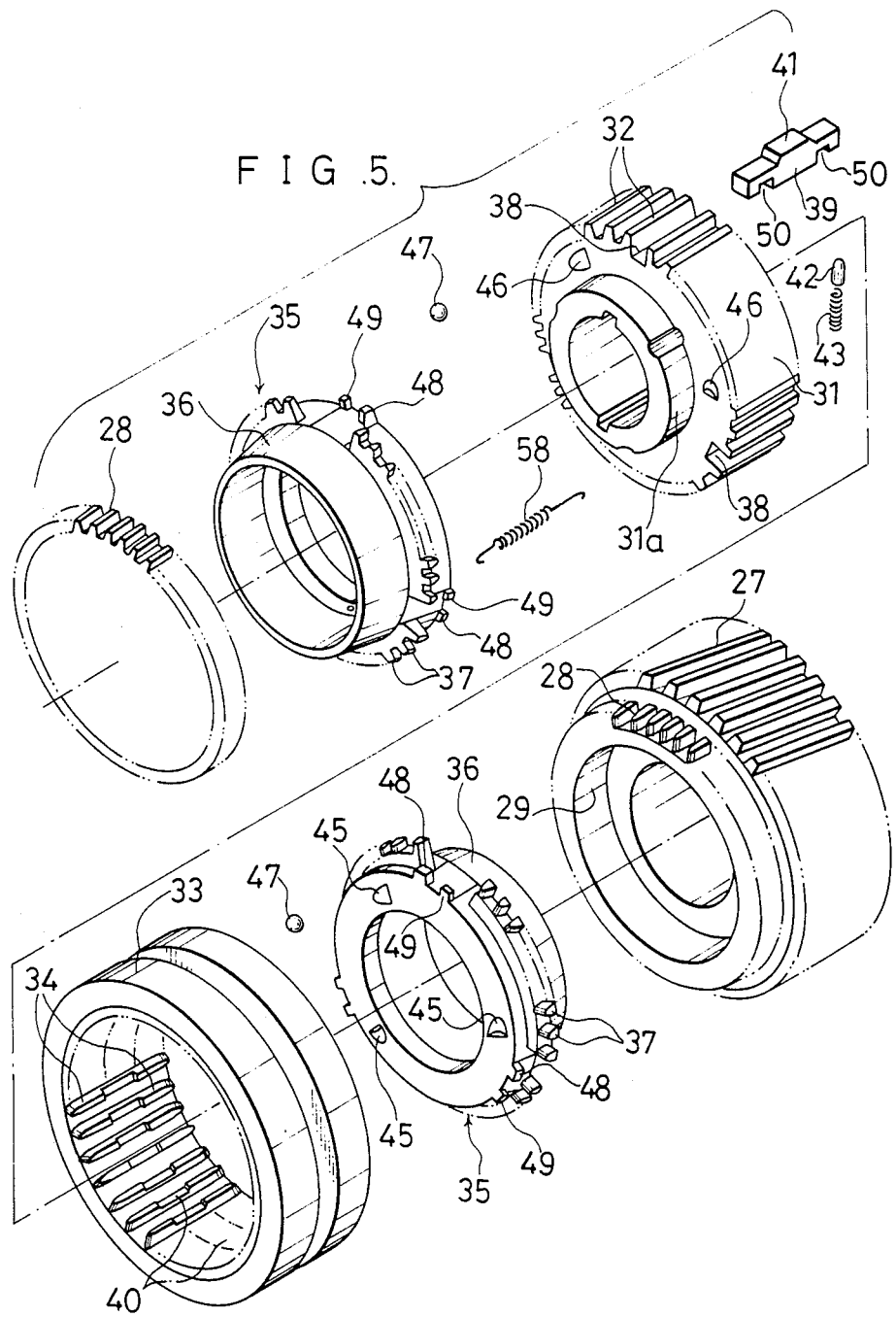
FIG. 5 is a perspective view showing various members of the clutch mechanism shown in FIG. 2 in an exploded condition.

As shown in FIG. 2 and in FIGS. 4 and 5, an annular recess 40 is formed in an axially central region of the inner circumference of sleeve member by depressing the splines 34 by a suitable amount. n a central region of the outer surface of each key member 39 is formed an integral projection 41 which may be received in the annular recess 40 of sleeve member. Hub member 31 includes three radial bores, each having an open end at each axial groove 38, in which three latch pins 42 are slidably received. Each of these latch pins 42 is biased by a spring 43 to move radially outwardly so as to project into a notch 44 in the inner surface of each key member 39 at a neutral position of such key member shown in FIG. 2 for latching the key members 39 and sleeve member 33 at their neutral positions. It is fashioned that, even at a condition where each latch pin 42 is out of the notch 44, each key member 39 is biased to move radially outwardly by each spring 43 through the pin 42 which engages the inner surface of key member 39. Consequently, projection 41 of such key member 39 is received in the annular recess 40 under the biasing of spring 43 so that the key member 39 is engaged non-slidably with the sleeve member 33. The projection 41 will get out of the annular recess 40 when the sleeve member 33 is shifted axially towards a clutch gear 28 under a condition where the key member 39 is restrained from a sliding movement towards the clutch gear 28. Both of the axial end faces of annular recess 40 and projection 41 are tapered, as shown in FIG. 2 by numeral 41a with respect to those of the projection 41, so as to assure an easy getting-out of the projection 41 and so as to assure an easy re-entering of the projection 41 into the recess 40 that will be caused when the sleeve member 33 is shifted axially away from a clutch gear 28 under a condition where the key member 39 is restrained from a sliding movement in a direction away from the clutch gear 28.

Figure 3:
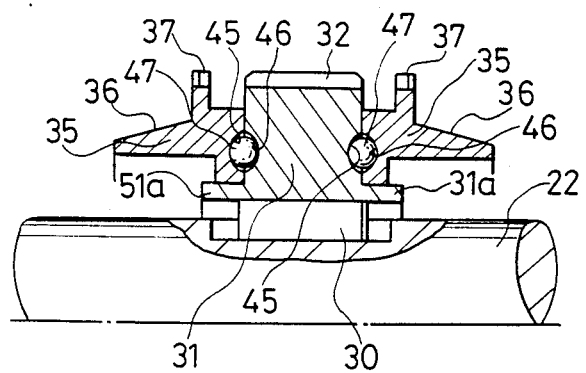
FIG. 3 is a longitudinal sectional view of a part of a clutch mechanism shown in FIG. 2, showing a section different from that shown in FIG. 2.

As shown in FIGS. 3 to 5 and in the lower side views of FIGS. 10(a)–10(k), three pairs of circumferentially spaced cam grooves having bottom ramp surfaces 45 and 46 are formed in the opposite end faces of synchronizer ring 35 and hub member 31, respectively. Each pair of the cam grooves include therein a ball 47. Clutch gear 28 associated with the forward direction gear 26 has a rotational direction along arrow F shown in FIG. 10(a), whereas clutch gear 28 associated with the backward direction gear 27 has a rotational direction along arrow R shown in FIG. 10(a). The bottom ramp surfaces 45 and 46 of each pair of the cam grooves are inclined so that, when the synchronizer ring 35 of each side is displaced towards the rotational direction of clutch gear 28 of the same side relative to the hub member 31, axial interval between the bottom ramp surfaces 45 and 46 becomes reduced.

Figure 10H:
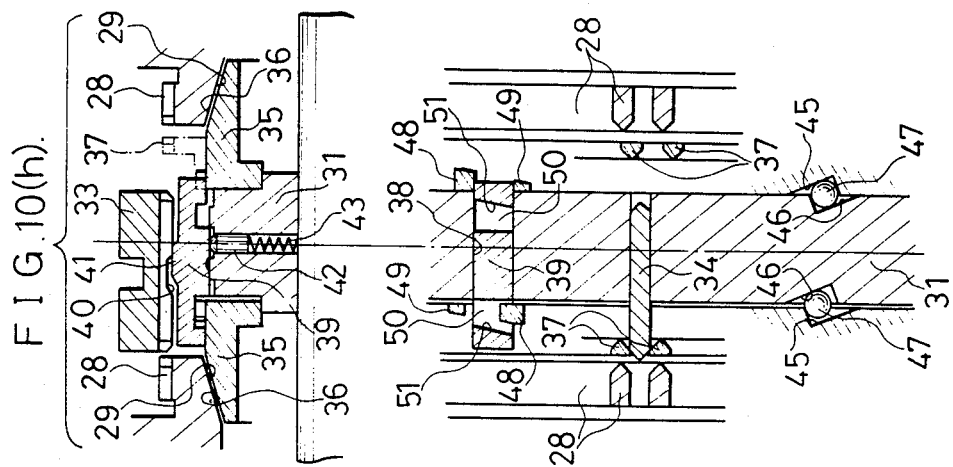

As clearly shown in FIG. 5 and in the lower side views of FIGS. 10(a) to 10(k), each synchronizer ring 35 has at its outer circumference three pairs of first and second stopper projections 48 and 49. These projections are disposed such that, when the sleeve member 33 is in its neutral position shown in FIG. 10(a), each first projection 48 engages with each key member 39 from the upstream side of the rotational direction of clutch gear 28, whereas each second projection 49 engages with each key member 39 from the downstream side of the rotational direction of clutch gear 28. As shown in FIG. 2 and in FIGS. 6 to 9, each key member 39 includes at its inner surface a pair of left and right recesses 50. As shown in the lower side view of FIG. 10(d) with respect to one of the recesses 50, the recess 50 of each side is disposed such that, when the key member 39 is displaced axially toward clutch gear 28 of the same side by a predetermined small amount, the first stopper projection 48 may enter the recess 50 so as to permit a rotational displacement of the synchronizer ring 35 towards the rotational direction of the clutch gear 28. The recess 50 has first and second axial end faces 51 and 52 between which the first stopper projection 48 is located when such projection has entered the recess 50. As shown in FIG. 10(k), the first end face 51 positioned at the side of clutch gear 28 is formed into a ramp surface having an inclination such that, when the key member 39 is displaced axially away from the clutch gear 28 in a condition where the projection 48 is located within the recess 50, the ramp surface 51 pushes the stopper projection 48 so as to rotate the synchronizer ring 35 towards a direction reverse to the rotational direction of clutch gear 28. The projection 48 includes a chamfered portion at which the ramp surface 51 acts upon such stopper projection. As shown in FIG. 10(f), axial length of the key member 39 is predetermined relative to axial positions of the stopper projections 48 and 49 on the synchronizer rings 35 of both sides such that, even at a state where one end of the key member 39 takes a position closest to the clutch gear 28 of one side, the other end of the key member still remains between the stopper projections 48 and 49 on the synchronizer ring 35 of the other side.

As clearly shown in FIGS. 7 to 9, each axial groove 38 of the hub member 31 has a bottom surface which includes thereon axially spaced two protrusions 54. On the inner surface of each key member 39 are formed at corner portions thereof two pairs of legs 55 which may ride on the protrusions 54, respectively. These protrusions 54 and legs 55 are disposed such that they are in a close overlapped relationship in the axial direction of the clutch assembly at the neutral condition of clutch, as shown in FIG. 8. When the key member 39 has been moved axially relative to the hub member 31 to a position where legs 55 leave the protrusions 54, the key member 31 is pushed down by the sleeve member 33 radially inwardly of the groove 38 as shown in FIG. 9. Height of each protrusion 54 is predetermined such that, at a condition where legs 55 ride on the protrusions 54, the key member 39 is kept at a radial position where the projection 41 on the outer surface thereof remains projected into the annular recess 40 of sleeve member 33. As can be seen from FIG. 9, each leg 55 has an axial width smaller than the interval between the two protrusions 54. It is thus seen that at a pushed-down condition of the key member 39, such as shown in FIG. 9, axial displacement of the key member into one or the other direction becomes prevented by the hub member 31 after the key member has been displaced by a distance corresponding to the clearance between one of the protrusions 54 and one of the pairs of legs 55 to result in an engagement of the legs with one of the protrusions. The key member 39 is shaped generally to have a T-letter configuration including a radially inwardly depending leg portion and a pair of axial extensions, which extend towards synchronizer rings 35, and is designed such that it thrusts the synchronizer rings 35 of one and the other sides by one and the other axial end faces 59 of the leg portion (hereinafter referred to as "thrusting surfaces"). Each of the recesses 50 is formed in the inner surface of each of the axial extensions such that the second axial end face 52 referred to before is continuous with each thrusting surface 59.

As shown in FIGS. 2 and 4, the hub member 31 includes three axial thorough bores 57 through which three return springs 58, hooked to the synchronizer rings 35 of both sides, extends. As shown in FIG. 1, a shifter 60 is provided which engages with the sleeve member 33 at an annular groove in the outer circumference of the sleeve member.

As is conventional in a synchronizer clutch, both ends of the splines 34 of sleeve member 33 and one ends of the splines 37 of each synchronizer ring 35, at which one ends splines 34 of the sleeve member start to engage with splines 37 of the synchronizer ring, are V-shaped by chamfering. Each clutch gear 28 comprises teeth or splines having similarly shaped one ends at which splines 34 of the sleeve member start to engage with the clutch gear 28. Angular position of each synchronizer ring 35 relative to the hub member 31 at the neutral condition of clutch shown in FIG. 10(a) is determined by the positioning of stopper projections 48 and 49 on the synchronizer ring 35 relative to the key-receiving axial groove 38 in the outer surface of hub member 31. Such angular position of the ring 35 relative to the hub member is predetermined such that a tapered end face of one of the splines 37 on the synchronizer ring 35 is in alignment axially of the clutch mechanism with a tapered end face of one of the splines 34 of sleeve member 33 which splines are meshed or engaged with splines 34 of the hub member 31.

FIGS. 10(a) to 10(k) are illustrations for explaining operation of the clutch mechanism. In each of these figures, the upper side view depicts a longitudinal section of a half of the clutch mechanism and the lower side view depicts a section of a part of the clutch mechanism taken along an imaginary cylindrical surface. In the lower side view, there are shown for an easier understanding only one of the splines 34 of sleeve member 33, only two of the splines 37, adjacent to each other, of each synchronizer ring 35, and only two of the teeth or splines, adjacent to each other, of each clutch gear 28, respectively. Engagement between splines 32 of the hub member 31 and splines 34 of the sleeve member 33 is shown in a way such that clearance between two adjacent splines 32 of the hub member 31 is illustrated as an imaginary groove in which one of the splines 34 is fittingly received.

Figure 10G:
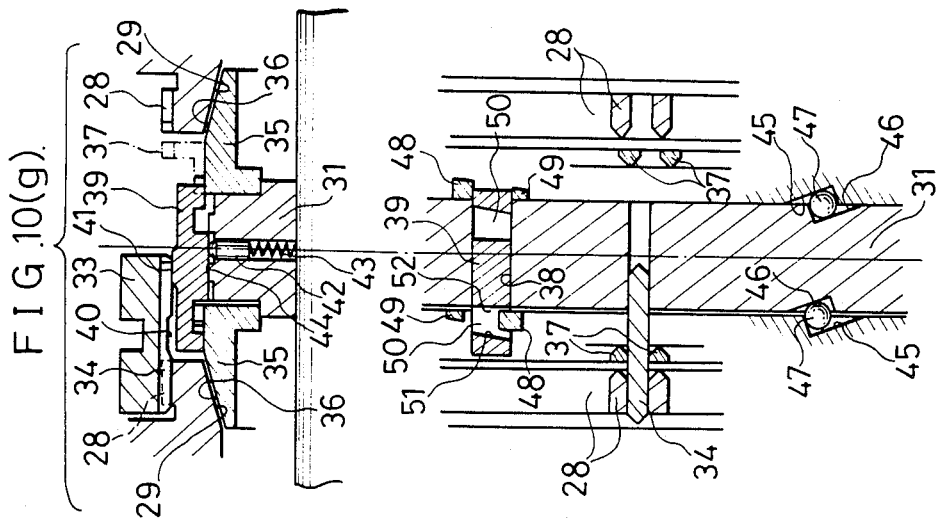

FIG. 10(a) shows the neutral condition of clutch mechanism, whereas FIG. 10(g) shows the fully engaged condition of left clutch, as viewed in FIG. 10(a) to FIG. 10(k). FIGS. 10(b) to 10(f) illustrate intermediate conditions in the process of clutch-engaging operation of the left clutch from the neutral condition shown in FIG. 10(a) to the engaged condition shown in FIG. 10(g), whereas FIGS. 10(h) to 10(k) illustrate intermediate conditions in the process of clutch-disengaging operation of the left clutch from the engaged condition shown in FIG. 10(g) to the neutral condition shown in FIG. 10(a).

In the neutral condition shown in FIG. 10(a), each key member 39 is located at the position shown in FIG. 8 where the projection 41 thereof is received in the annular recess 41 of sleeve member 33 and where each latch pin 42 is projected into the notch 44 of key member under the biasing of spring 43. One and the other ends of the key member 39 are located between the first and second stopper projections 48 and 49 on the synchronizer rings 35 of one and the other sides, respectively, so that each of the synchronizer rings is prevented from rotation relative to the hub member 31. Clutch gear 28 associated with the forward direction gear 26 shown in FIG. 2 is rotating towards the direction of arrow F, whereas clutch gear 28 associated with the backward direction gear 27 shown in FIG. 2 is rotating towards the direction of arrow R.

When sleeve member 33 is shifted using the shifter 60 shown in FIG. 1 from the neutral position shown in FIG. 10(a) towards the left, as viewed in these figures, for a purpose of coupling the forward direction gear 26 to the output shaft 22, key member 39 which is engaged non-slidably with the sleeve member at the projection 41 received in the annular recess 40 is moved towards the left so that the lefthand recess 50 of the key member is displaced into a position shown in FIG. 10(b) where the recess 50 is located between stopper projections 48 and 49 of the lefthand synchronizer ring 35 so as to permit rotation of the ring. At this stage, splines 34 of the sleeve member 33 become engaged at their tapered end faces with the tapered end faces of splines 37 of the synchronizer ring 35 and the thrusting surface 59 (FIGS. 6 to 9) of key member 39 becomes in abutment with synchronizer ring 35. Although legs 55 of the key member shown in FIGS. 7 to 9 become away off protrusions 54 on the bottom surface of key-receiving groove 38, projection 41 of the key member 39 remains in the annular recess 40 of sleeve member 33 due to the biasing force of spring 43, acting still upon the key member through latch pin 42 which is now out of the notch 44, so that the key member remains engaged non-slidably with sleeve member 33.

A further shifting of the sleeve member 33 from the condition shown in FIG. 10(b) will cause a further sliding movement of the key member 39 so that the thrusting surface 59 thereof (FIGS. 6 to 9) thrusts the synchronizer ring 35 towards the left so as to press the second clutch surface 36 of synchronizer ring 35 against the first clutch surface 29 of clutch gear 28, as shown in FIG. 10c). At this stage shown in FIG. 10c), synchronizer ring 35 becomes spaced towards the left from the hub member 31 so that ball 47 is once brought into a floating condition.

At the same time that the second clutch surface 36 becomes pressed against the first clutch surface 29, as stated above, synchronizer ring 35 becomes dragged by the rotating clutch gear 28 so as to rotate towards the rotational direction of clutch gear 28, as shown in FIG. 10(d), so that axial interval between the bottom ramp surfaces 45 and 46 of the cam grooves becomes reduced. Consequently, ball 47 rides upon such ramp surfaces 45 and 46 to generate an axial component of rotating force or torque applied to the synchronizer ring 35 along arrow F so that the synchronizer ring 35 is urged towards clutch gear 28. By this, engagement between the clutch surfaces 29 and 36 is enhanced so that rotating force or torque applied to synchronizer ring 35 by the clutch gear 28 is heightened. Consequently, thrusting force applied to the synchronizer ring 35 through the ball 47 and bottom ramp surface 45 is further heightened. It is thus seen that thrusting of the synchronizer ring 35 against clutch gear 28, namely frictional, engagement of the second clutch surface 36 with the first clutch surface 29 will proceed with a self-servo effect.

As a result of rotation of the synchronizer ring 35 dragged by the rotating clutch gear 28 which rotation begins from the condition shown in FIG. 10c), synchronizer ring 35 is rotationally displaced relative to the hub member 31 into the angular position shown in FIG. 10(d) where spline 37 of the synchronizer ring having been located at the upstream side of rotational direction becomes engaged at its tapered end face with the tapered end face of spline 34 of the sleeve member 33 and where the first stopper projection 48 of synchronizer ring 35 is located within the recess 50 of key member 39. Until a synchronous rotation of the synchronizer ring 35 with the clutch gear 28 has been attained by a full engagement of the second clutch surface 36 with the first clutch surface 29, displacement of the sleeve member 33 towards the left is prevented by a torque component which is caused at the mutually engaging tapered end faces of splines 34 and 37 so as to resist against a leftward displacement of the spline 34. Because frictional engagement of the second clutch surface 36 with the first clutch surface 37 proceeds with the self-servo effect set forth above, synchronous rotation of the synchronizer ring 35 due to the full engagement between clutch surfaces 29 and 36 is attained spontaneously and rapidly. The synchronous rotation of synchronizer ring 35 is transmitted to the hub member 31 through ball 47 and bottom ramp surface 46 so that a synchronized condition is attained where synchronizer ring 35 and hub member 31 (and, therefore, sleeve member 33 engaged non-rotatably with the hub member through meshing splines 32 and 34) rotate with a speed same as that of the clutch gear 28.

When the synchronous rotation has been attained under the condition shown in FIG. 10(d), sleeve member 33 is displaced, by operating force applied thereto so as to shift same towards the left, with causing some rotational displacement of the hub member 31 into a position shown in FIG. 10(e) where splines 34 of the sleeve member become meshed with splines 37 of the synchronizer ring 35. Such displacement of sleeve member 33 is permitted because hub member 31 is freely rotatable relative to the synchronizer ring 35 towards the rotational direction shown with arrow F so that the sleeve member 33 can be shifted towards the left with causing a rotational displacement of the hub member. In the condition shown in FIG. 10(d), the key member 39 can be moved towards the left no more because its thrusting surface 59 (FIGS. 6 to 9) abuts on an end face of the synchronizer ring 35 which is now restrained from a leftward movement by clutch gear 28. Consequently, when the sleeve member 33 is shifted from the position shown in FIG. 10(d) to the position shown in FIG. 10(e), key member 39 remains at the position shown in FIG. 10(d) so that annular recess 40 in the inner surface of sleeve member 33 leaves projection 41 on the outer surface of key member 39. As a result of this, the key member is pushed or depressed, as shown in FIG. 10(e), inwardly within the key-receiving groove 38. Further, as a result of some rotational displacement of the hub member 31 relative to the sychronizer ring 35 towards the direction of arrow F, axial interval between the bottom ramp surfaces 45 and 46 of cam grooves is enlarged so that ball 47 is brought, as shown in FIG. 10(e), into a floating condition within the cam grooves.

In the condition shown in FIG. 10(e) where engagement between the clutch surfaces 29 and 36 is released, driven side of the clutch, extending from hub member 31 via output shaft 22 until a propeller (not shown) and having a large inertial mass, has already been synchronized in rotation with the lefthand clutch gear 28. Consequently, the sleeve member 33 is moved by operating force, successively applied thereto, towards the left to achieve a smooth meshing of its spline 34 with clutch gear 28 or splines thereof, as shown in FIG. 10(f). In the conditions shown in FIGS. 10(e) and 10(f), re-engagement between the clutch surfaces 29 and 30 is never caused because of the floating condition of ball 47 within the cam grooves.

Rotation of the clutch gear 28 is now transmitted via sleeve member 33 and hub member 31 to the output shaft 22. This means that the forward direction gear 26 shown in FIG. 2 is coupled to the output shaft 22. In the fully engaged condition of clutch, synchronizer ring 35 does not participate in torque transmission and is freed so that it takes a position shown in FIG. 10(g) where the clutch surface 36 thereof is apart from the clutch surface 29 of clutch gear 28. Similarly, key member 39 which is also in a freed condition takes an optional position within the clearance between protrusions 54 and legs 55 shown in FIG. 9. The key member 39 may thus takes a position shown in FIG. 10(g) where it is restrained from a rightward movement, as viewed in FIG. 10(g), due to abutment of the legs 55 against protrusions 54 as shown in FIG. 9.

During the clutch-engaging process of the lefthand clutch mechanism and also in the fully engaged condition of such clutch mechanism, a right end portion of the key member 39 is always located between the first and second stopper projections 48 and 49 on the righthand synchronizer ring 35 so as to prevent same from a rotational displacement so that a spontaneous engagement of the righthand clutch mechanism does not occur. Centrifugal force caused by the rotation of hub member 31 is applied to the righthand ball 47 so as to engage same with the ramp surface 45 so that the righthand synchronizer ring 35 might be displaced towards the right (without a rotational displacement) to cause a contact between clutch surfaces 29 and 36 and, therefore, to cause an abnormal wear of the clutch surfaces. However, the occurence of such phenomenon is avoided by the return spring 58 which prevents the rightward displacement of righthand synchronizer ring 35 referred to above.

Clutch-disengaging process of the lefthand clutch mechanism from the fully engaged condition shown in FIG. 10(g) to the neutral condition shown in FIG. 10(a) will now be explained by referring to FIGS. 10(h) to 10(k).

When sleeve member 33 is displaced or shifted from the position shown in FIG. 10(g) towards the right using the shifter 60 shown in FIG. 1, splines 34 of the sleeve member are released firstly from meshing with the lefthand clutch gear 28 as shown in FIG. 10(h) with respect to one of the splines 34.

When the sleeve member 33 has reached by a further rightward displacement thereof a position where each of the splines 34 has been pulled out of the clearance between each two adjacent splines 37 as shown in the lower side view of FIG. 10(i), synchronizer ring 35 becomes rotatable relative to the hub member 31. Consequently, so far as any contact of the syncronizer ring 35 with clutch gear 28 occurs or so far as there exists a lot of lubricant, sludge or the like between the clutch gear 28 and synchronizer ring 35, the synchronizer ring 35 becomes dragged by the rotating clutch gear 28 to rotate towards the direction of arrow F so that axial interval between the bottom ramp surfaces 45 and 46 of cam grooves is reduced. By this, the synchronizer ring 35 is urged by the ball 47 towards the clutch gear 28 so that re-engagement between the clutch surfaces 29 and 36 may be caused as shown in the upper side view of FIG. 10(i).

When the sleeve member 33 is displaced towards the right as shown in FIGS. 10(h) and 10(i), key member 39 is kept unmoved towards the right because legs 55 of such member are in an engagement, as shown in FIG. 9, with protrusions 54 on the bottom surface of key-receiving groove 38. Consequently, when the shifter sleeve 33 is displaced via the position shown in the upper side view of FIG. 10(i) into a position shown in the upper side view of FIG. 10(j) where annular recess 40 in the inner surface of sleeve member 33 becomes aligned with projection 41 on the outer surface of key member 39, the key member is moved under the biasing of spring 43 radially outwardly so that the projection 41 is received again in the annular recess 40 as shown in the upper side view of FIG. 10(j). Accordingly, legs 55 of the key member shown in FIG. 9 is raised to the level of upper surfaces of the protrusions 54 so that, from the condition shown in FIG. 10(j), key member 39 is moved towards the right as the sleeve member 33 is displaced towards the right.

By this rightward movement of key member 39, the first inner end face 51 of recess 50 of the key member 39 becomes engaged, as shown in FIG. 10(k), with the first stopper projection 48 of synchronizer ring 35. As the key member 39 is moved further towards the right by sleeve member 33, the inclined end face or ramp surface 51 pushes the first projection 48 so as to rotate the synchronizer ring 35 relative to hub member 31 towards the direction reverse to arrow F. By such rotational displacement of synchronizer ring 35, ball 47 becomes disengaged from the bottom ramp surfaces 45 and 46 of cam grooves and synchronizer ring 35 becomes separated from the clutch gear 28 so that engagement between the clutch surfaces 29 and 36 becomes released. The first stopper projection 48 will get out of the recess 50 due to the rotational displacement of synchronizer ring 35 towards the direction reverse to arrow F. By a succeeding displacement of the sleeve member 33 to its neutral position, key member 39 is moved to the position shown in FIG. 10(a) where it is sandwiched between the first and second projections 48 and 49 on the synchronizer ring 35.

During the clutch-disengaging process for the left-hand clutch mechanism having been detailed hereinbefore, a spontaneous engagement of the righthand clutch mechanism as well as a contact between the righthand synchronizer ring 35 and clutch gear 28 do not occur, too.

Clutch-engaging process and clutch-disengaging process for the righthand clutch mechanism will proceed similarly with an exception arising from the reverse rotational direction of righthand clutch gear 28 along arrow R.

Figure 11B:
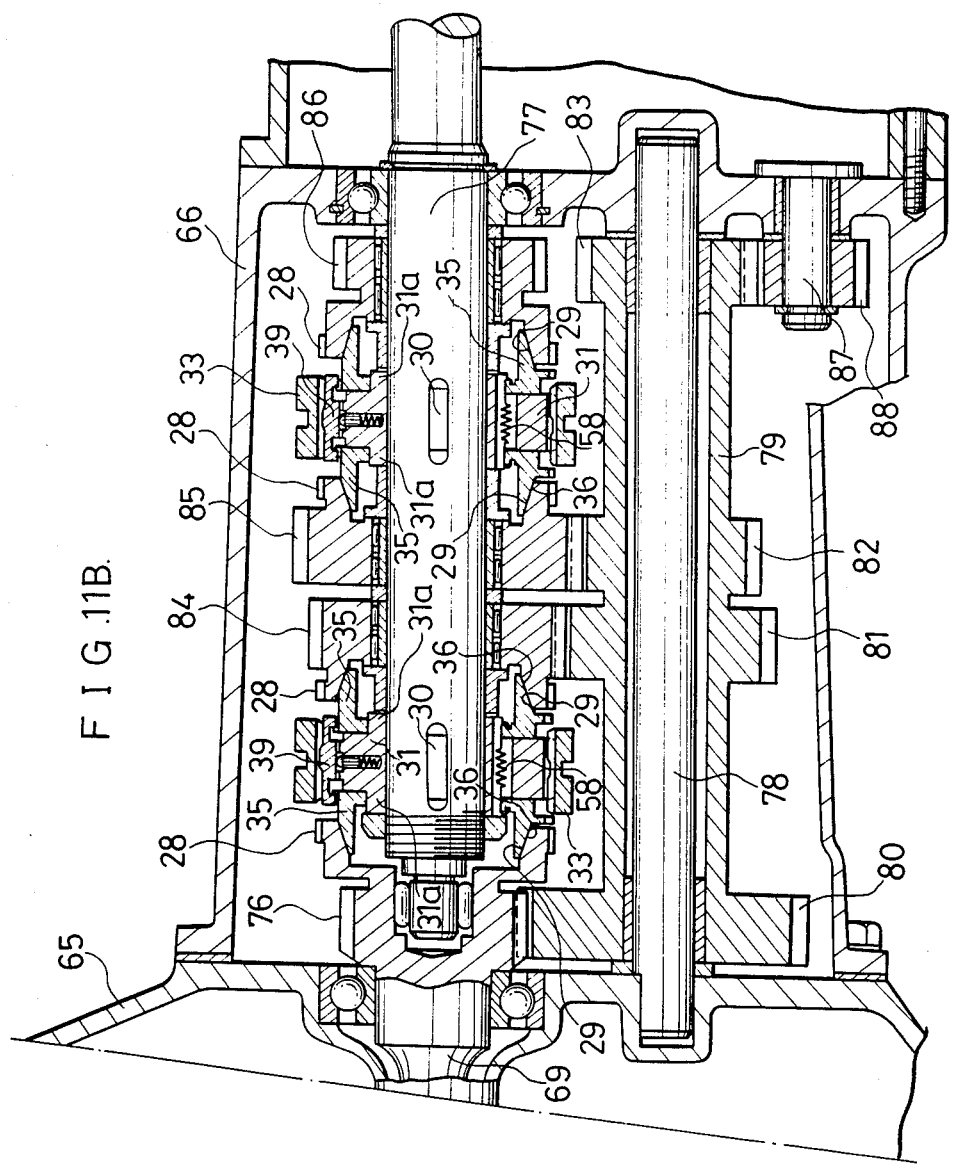

FIGS. 11A to 14 depict a second preferred embodiment of the present invention which is employed in a vehicle power transmission shown in FIGS. 11A and 11B.

In FIGS. 11A and 11B, numerals 65 and 66 designate, respectively, a clutch housing and transmission casing which are arranged in a tractor in series along a longitudinal direction of the tractor so as to constitute a part of the vehicle body. A main clutch 67 is disposed within the clutch housing 65 for selectively interrupting the input of engine power into the transmission casing, whereas a speed-change mechanism is disposed within the transmission casing 66 for variably controlling the vehicle speed.

The main clutch 67 shown is fashioned as a friction clutch which is operable to disconnect selectively between an engine flywheel 68 and a drive shaft 69 for transmitting power into the transmission casing 66. Within a clutch cover 70 which is secured to the flywheel 68 are disposed a clutch disk 71, which is mounted non-rotatably on the drive shaft 69, a pressure plate 72 and diaphragm spring 73 which are corotatable with the clutch cover 70. Clutch disk 71 is urged by the spring 73 via pressure plate 72 so as to engage frictionally with the flywheel 68. On the drive shaft 69 is slidably mounted a throwout bearing 74 with which a throwout yoke 75 is engaged. When a clutch pedal not shown in, the drawings is trod down so as to displace the bearing 74 towards the left, as viewed in FIG. 11A, through the yoke 75, the diaphragm spring 73 which also functions as a throwout lever is moved so as to displace the pressure plate 72 away from the clutch disk 71 so that the main clutch is released.

The drive shaft 69 extends at its rear end portion into the transmission casing 66 and carries at such end portion an integral input gear 76. Within the casing 66 are arranged a speed-change shaft 77, which extends co-axially with drive shaft 69, and a hollow countershaft 79 which is rotatably mounted on a fixed support shaft 78 and extends parallel with the change shaft 77. The countershaft carries at its front end portion an integral gear 80 which is meshed with the input gear 76 so that countershaft 79 is constantly driven to rotate by the drive shaft 69. Countershaft 79 further carries thereon three integral counter gears 81, 82 and 83, whereas speed-change shaft 77 mounts rotatably three speed-change gears 84, 85 and 86. Of these gears on the shafts 79 and 77, gears 81 and 84 and gears 82 and 85 are directly meshed, respectively, as shown in FIG. 11B, whereas gears 83 and 86 are meshed via an idler gear 88 which is supported freely rotatably by the transmission casing through an idler shaft 87.

The input gear 76 has an integral clutch gear 28 associated thereto and extending over a front end portion of the change shaft 77. Similarly, each of the change gears 84, 85 and 86 on the change shaft has an integral clutch gear 28. Two of these clutch gears 28 are paired, respectively, and a double-acting, synchronizing clutch assembly similar to that of the first embodiment is disposed between each pair of clutch gears 28. Speed-change mechanism disposed within the transmission casing 66 is fashioned to provide selectively first to third forward direction speeds and a backward direction speed to the change shaft 77 by a selective coupling of gears 76, 84, 85 and 86 to the shaft 77 using respective clutch assemblies. Speed-change shaft 77 is drivingly connected to left and rear wheels of the tractor which are not shown in the drawings.

Synchronizing clutch assembly of the second embodiment will be detailed hereinafter by designating various members and parts, including clutch gear 28 referred to above, with like numerals employed in the description of the first embodiment.

As shown in FIG. 11B, each of the two sets of double-acting clutch assemblies comprises a hub member 31 secured to the shaft 77 using key 30, a sleeve member 33 mounted slidably but nonrotatably on the hub member by a splined connection, a pair of synchronizer rings 35 slidably mounted on diameter-reduced end portions 31a of the hub member 31, and one or more keys 39 slidably received in one or more key-receiving grooves 38 (FIG. 12) in the outer circumference of hub member 31, all of which will function the same as the corresponding members of the first embodiment do. As can be seen from FIGS. 11A, 12 and 13(a), each of the clutch gear 28 and sleeve member 33 is just the same as that of the first embodiment.

Synchronizing clutch assembly of the first embodiment is employed in a marine reversing gear shown in FIG. 1 so that, prior to an operation of the synchronizing clutch mechanism including the case of a selective reversing of the rotational direction of output shaft 22, clutch gear 28 is rotating necessarily with a speed higher than that of the output shaft 22. In other words, synchronizing clutch mechanism of the first embodiment necessarily performs a speed-up engagement by which the output shaft 22 is brought from a lower-speed condition to a higher-speed condition. Contrarily to this, synchronizing clutch mechanism of the second embodiment is employed in a speed-change transmission which is operated for a speed-change purpose in a condition where the main clutch 67 shown in FIG. 11A has once been released. Rotational speed of the clutch gear 28 prior to an engaging operation of such synchronizing clutch mechanism may be either higher or lower than that of the speed-change shaft 77 in dependence on various conditions such that which gear of the gears 76, 84, 85 and 86 has been coupled to the shaft 77 since then, how a clutch-engaging operation is timed relative to the prior main clutch-releasing operation, whether a speed-change operation is carried out as the vehicle runs up or down a slope, and so on. Consequently, it is required to make this synchronizing clutch mechanism such that it can perform both of a speed-up engagement, by which the change shaft 77 is brought from a lower-speed condition to a higher-speed condition, and a speed-down engagement by which the change shaft 77 is brought from a higher-speed condition to a lower-speed condition. For this, structures which will be detailed hereinafter are employed in this second embodiment.

As shown in FIGS. 12 and 13(a), the key member 39 is fashioned to include a recess 50 having an axial end face, located at the side of clutch gear 28, which face has thereon first and second ramp surfaces 51A and 51B. Of these ramp surfaces the first ramp surface 51A is inclined along an angular direction same as that for the ramp surface 51 provided in the key member employed in the first embodiment, whereas the second ramp surface 51B is inclined along another angular direction reverse to that for the first ramp surface 51A. Of first and second stopper projections 48 and 49 on the synchronizer ring 35, the second projection 49 is designed to have a size similar to that of the first projection 48 and to include a chamfered portion extending substantially parallel with the second ramp surface 51B.

As shown in FIG. 13(a), the opposite end faces of synchronizer ring 35 and hub member 31 include V-shaped cam grooves having a first pair of bottom ramp surfaces 45A and 46A, which are inclined along an angular direction same as that for the ramp surfaces 45 and 46 provided in the first embodiment, and a second pair of bottom ramp surfaces 45B and 46B which are inclined along another angular direction reverse to that for the first pair of ramp surfaces. Ball 47 is received in such cam grooves.

Lefthand and righthand recesses 50 of the key member 39 are shaped similarly to each other. First and second projections 48 and 49 on the lefthand and righthand synchronizer rings 35 are similarly shaped. This is also applied to lefthand cam grooves and righthand cam grooves formed in the hub member 31 and synchronizer rings 35.

Angular position of each synchronizer ring 35 relative to the hub member 31 at the neutral condition of clutch shown in FIG. 13(a) is determined by the positioning of first and second stopper projections 48 and 49 on the synchronizer ring 35 relative to key-receiving groove 38 in the hub member 31. Such angular position of the synchronizer ring 35 at the neutral condition is predetermined such that each of the splines 34, which are meshed with splines 32 of the hub member 31, is aligned axially with a clearance between each two adjacent splines 37 of the synchronizer ring 35.

The other parts of the second embodiment are fashioned similarly to the corresponding parts of the first embodiment and are designated by like numerals.

FIGS. 13(a) to 13(k) are views for explaining a speed-up engagement process of the clutch and a clutch-disengaging process after such speed-up engagement and are illustrated in a fashion similar to FIGS. 10(a) to 10(k). It is provided that the lefthand clutch gear 28 is rotating relative to hub member 31 towards the direction of arrow F shown in FIG. 13(a).

During the speed-up engagement process from the neutral condition shown in FIG. 13(a) to a fully engaged condition shown in FIG. 13(g), the clutch-engaging process from the neutral condition via the stage shown in FIG. 13(b) to the stage shown in FIG. 13(c) proceeds similarly in the first embodiment, namely in a manner set forth before by referring to FIGS. 10(b) and 10(c), with an exception that the spline 34 of sleeve member 33 does not become in contact with spline 37 of the synchronizer ring 35.

At the stage shown in FIG. 13(c), where synchronizer ring 35 is moved by the key member 39 towards the left so as to cause an initial engagement between the first and second clutch surfaces 29 and 36, the synchronizer ring 35 is rotated relative to the hub member 31 towards the direction of arrow F, as shown in FIG. 13(d), so that axial interval between the ramp surfaces 45A and 46A becomes reduced. Consequently, as described before with respect to the first embodiment by referring to FIG. 10(d), the synchronizer ring 35 is urged towards the left by the ball 47 under a condition where sleeve member 33 is restrained from a leftward movement due to an engagement between tapered end faces of the splines 34 and 37. As a result of this, a full engagement between the clutch surfaces 29 and 36 becomes achieved spontaneously and quickly. Synchronizer ring 35 now rotates synchronously with the clutch gear 28, and hub member is also rotated synchronously by the ring 35 through ball 47. Contrarily to the case of the first embodiment, hub member 31 employed in the second embodiment cannot be operated through sleeve member 31 to displace rotationally towards the direction of arrow F because the hub member 31 is constantly connected to grounded wheels of the vehicle.

However, the main clutch 67 shown in FIG. 11A is now in a released condition so that clutch gear 28 and synchronizer ring 35 are now freely rotatable relative to the hub member towards the reverse direction of arrow F. Accordingly, after the synchronized rotation has been attained at the condition shown in FIG. 13(d), sleeve member 33 is displaced towards the left by operating force applied thereto, with causing some rotational displacement of the synchronizer ring 35 towards the reverse direction of arrow F relative to the hub member 31, so that splines 34 of the sleeve member 33 are meshed, as shown in FIG. 13(e) with respect to one of such splines, with splines 37 of the synchronizer ring 35. In the second embodiment, the first stopper projection 48 of synchronizer ring 35 is moved, as shown in FIG. 13(e), out of the recess 50 of key member 39 as a result of the rotational displacement of ring 35 referred to above.

The synchronizer ring 35 becomes freed at the condition shown in FIG. 13(e). The sleeve member 33 is further moved towards the left by operating force successively applied thereto so that meshing of the splines 34 thereof with splines of the clutch gear 28 is attained, as shown in FIG. 13(f), with ease, as is the case in the first embodiment and as described before by referring to FIG. 10(f).

In the fully engaged condition of clutch shown in FIG. 13(g), synchronizer ring 35 and key member 39 take, respectively, positions similar to those set forth before by referring to FIG. 10(g).

Prior to a clutch-disengaging operation of the left-hand clutch mechanism from the fully engaged condition shown in FIG. 13(g), the main clutch 67 shown in FIG. 11A is once released again. In a case where the clutch gear 28 is rotating faster than hub member 31 towards the direction of arrow F shown in FIG. 13(h) after the main clutch has been released, the clutch-disengaging process will proceed in a manner similar to that for the first embodiment.

When splines 34 of the sleeve member 31 are released by a rightward shifting thereof from the clutch gear 28, as shown in FIG. 13(h), and then from splines 37 of the synchronizer ring 35, as shown in FIG. 13(i), synchronizer ring 35 may rotate relative to the hub member and, therefore, re-engagement between the first and second clutch surfaces 29 and 36 shown in FIG. 13(i) may be caused. When such re-engagement is caused, the first stopper projection 48 of synchronizer ring 35 enters the recess 50 of key member 39 again as a result of a rotational displacement of the synchronizer ring 35 relative to hub member 31 towards the direction of arrow F.

Consequently, after the projection 41 of key member 39 has entered the annular recess 40 of sleeve member 33, as shown in FIG. 13(j), so that the key member 39 has been engaged co-slidably with the sleeve member 33, and after the key member 39 has been displaced to the position shown in FIG. 13(k) where the ramp surface 51A becomes in abutment with the first projection 48 of synchronizer ring 35, the ring 35 is rotated relative to hub member 31 towards the reverse direction of arrow F so that the neutral condition shown in FIG. 13(a) is obtained in a manner detailed before by referring to FIG. 10(k). If a reengagement of the clutch surfaces 29 and 36 shown in FIG. 13(i) is not caused, the first projection 48 does not participate in the clutch-disengaging process and acts only as a stopper for preventing a rotational displacement of synchronizer ring at the neutral condition in cooperation with the second projection 49 and key member 39.

A speed-down engagement process of the clutch and a clutch-disengaging process after such speed-down engagement will now be explained by referring to FIGS. 14(b) to 14(k) which correspond, respectively, to the lower side views of FIGS. 13(b) to 13(k).

It is provided that, after the main clutch 67 shown in FIG. 11A has been released, speed-change shaft 28 is rotating faster than the lefthand clutch gear 28, as viewed in FIG. 14(b), so that hub member 31 is rotating relative to the clutch gear 28 towards the direction of arrow F shown in FIG. 14(b). As the sleeve member 31 is shifted from the neutral position shown in FIG. 13(a) towards the left, the clutch-engaging process will proceed via the condition shown in FIG. 14(b) to the condition shown in FIG. 14(c). These conditions are same as those shown in FIGS. 13(b) and 13(c).

When the condition shown in FIG. 14c) has been realized so that an initial engagement between the clutch surfaces 29 and 36 has been caused as shown in the upper side view of FIG. 13(c), the synchronizer ring 35 becomes dragged by the clutch gear 28 so that a rotational displacement of the ring 35 relative to the hub member 31 is caused. Because the rotational speed of hub member 31 is higher than that of clutch gear 28, such rotational displacement of the synchronizer ring 35 is made towards the reverse direction of arrow F.

Consequently, axial interval between the second ramp surfaces 45B and 46B becomes reduced, as shown in FIG. 14(d), and, therefore, the synchronizer ring 35 is urged towards the left by the thrusting force of ball 47 acting upon the ramp surface 45B so that a full engagement between the clutch surfaces 29 and 36 is attained spontaneously. As a result of the rotational displacement of synchronizer ring 35 set forth above, the second projection 49 thereof becomes entered in the recess 50 of key member 39.

Synchronizer ring 35 now co-rotates with hub member 31 through ball 47, and clutch gear 28 now rotates synchronously with the synchronizer ring 35 due to the full engagement of clutch surfaces 29 and 36. Because the main clutch 67 shown in FIG. 11A is in a released condition, the synchronizer ring 35 is rotatable relative to the hub member 31 towards the direction of arrow F. Consequently, sleeve member 33 is displaced towards the left by operating force applied thereto, with causing some rotational displacement of the synchronizer ring 35 towards the direction of arrow F relative to hub member 31, so that splines 34 of the sleeve member 33 are meshed, as shown in FIG. 14(e) with respect to one of the splines 34, with splines 37 of the synchronizer ring 35. As a result of the rotational displacement of synchronizer ring 35 referred to above, the second projection 49 thereof is moved out of the recess 50 of key member 39.

The synchronizer ring 35 becomes freed at the condition shown in FIG. 14(e). The sleeve member 33 is further moved towards the left by operating force successively applied thereto so that meshing of the splines 34 thereof with clutch gear 28 is attained, as shown in FIG. 14(f), with ease.

The fully engaged condition of clutch shown in FIG. 14(g) is same as that shown in FIG. 13(g).

In a case where the hub member 31 is rotating faster than clutch gear 28 towards the direction of arrow F shown in FIG. 14(h) after the main clutch 67 shown in FIG. 11A has been released prior to a disengaging operation of the lefthand clutch mechanism from the condition shown in FIG. 14(g), the clutch-disengaging process may proceed in a manner shown in FIGS. 14(h) to 14(k). When splines 34 of the sleeve member 31 are released from clutch gear 28, as shown in FIG. 14(h), and then splines 37 of the synchronizer ring 35, as shown in FIG. 14(i), the synchronizer ring 35 may rotate relative to hub member 31 towards the reverse direction of arrow F due to, for example, some contact with the clutch gear 28 so that re-engagement of the clutch surfaces 29 and 36 similar to such that is shown in the upper side view of FIG. 13(i) may be caused here again by the action of ball 47.

When such re-engagement is caused, the second projection 49 of synchronizer ring 35 enters the recess 50 of key member 39 and faces axially of the clutch towards the second ramp surfaces 51B, as shown in FIG. 14(i), as a result of the rotational displacement of synchronizer ring 35 relative to hub member 31. Consequently, in a manner similar to that set forth before by referring to FIGS. 13(j) and 13(k), after the condition shown in FIG. 14(k) has been attained via the condition shown in FIG. 14(j) the second ramp surface 51B begins to push the second projection 49 so as to rotationally displace the synchronizer ring 35 towards the direction of arrow F. The neutral condition shown in FIG. 13(a) is thus attained, as required.

Disengagement of the clutch mechanism from the fully engaged condition shown in FIGS. 13(g) and 14(g) may proceed either in accordance with the process shown in FIGS. 13(h) to 13(k) or in accordance with the process shown in FIGS. 14(h) to 14(k). As can be understood now, such process is determined by differential between the rotational speeds of clutch gear 28 and hub member 31 which still rotate by inertia after the main clutch has been released for a clutch-disengaging operation. It is thus seen that any of the processes set forth above may take place in dependence on various conditions whether the clutch mechanism has been engaged in accordance with the process shown in FIGS. 13(a) to 13(g) or in accordance with the process shown in FIGS. 14(b) to 14(g). By way of example, speed of inertial rotation of the hub member is relatively low when the vehicle is running up a slope, whereas such speed of hub member is relatively high when the vehicle is running down a slope.

The synchronizing clutch assembly of the second embodiment may also be used in a marine reversing gear such as shown in FIG. 1. In such a case, the second projection 49 of synchronizer ring 35 acts in cooperation with key member 39 only as a stopper for preventing an undesirable rotational displacement of the ring 35 because only the speed-up engagement of clutch mechanism is performed.

In the two embodiment having been detailed hereinbefore, cam means disposed between opposite end faces of the synchronizer ring 35 and hub member 31 is fashioned such that it includes a ball 47. Such cam means may also be fashioned, as shown respectively in FIG. 15 and in FIG. 16, such that it comprises ramp surfaces 145A, 145B, 146A and 146B which coact directly without a ball. Each of the cam means shown in FIGS. 15 and 16 is designed as an alternative of the cam means employed in the second embodiment and comprises a first pair of ramp surfaces 145A and 146A, which become engaged with each other when synchronizer ring 35 is rotationally displaced relative to hub member 31 towards a first direction, and a second pair of ramp surfaces 145B and 146B which become engaged with each other when synchronizer ring 35 is rotationally displaced relative to hub member 31 towards a second direction. Cam means shown in FIG. 15 includes a V-shaped projection for providing ramp surfaces 145A and 145B on the end face of synchronizer ring 35 and a V-shaped recess for providing ramp surfaces 146A and 146B in the end face of hub member 31, whereas cam means shown in FIG. 16 includes a V-shaped recess for providing ramp surfaces 145A and 145B in the end face of synchronizer ring 35 and V-shaped projection for providing ramp surfaces 146A and 146A on the end face of hub member 31.

When the synchronizer ring 35 is displaced from a neutral condition shown in FIG. 15(a) or FIG. 16(a) towards a clutch gear (not shown), as shown with an arrow in each of FIGS. 15(b) and FIG. 16(b), so that an initial engagement between first and second clutch surfaces is caused in a manner described before, the ring 35 becomes displaced rotationally relative to the hub member 31, as shown with arrow in each of FIG. 15(c) and FIG. 16(c), so that engagement between the first pair of ramp surfaces 145A and 146A is attained. In a case where rotational displacement of the synchronizer ring 35 is caused in the reverse direction, engagement between the second pair of ramp surfaces 145B and 146B will be attained.

Cam means shown in each of FIGS. 15 and 16 is not preferred in a respect that frictional force acting between the ramp surfaces of synchronizer ring 35 and hub member 31 will resist against a sliding movement of the synchronizer ring 35. On the other hand, such cam means contributes, during an operating process of the clutch mechanism of one side, to depress an undesirable axial displacement of synchronizer ring 35 of the other side.

An alternative of the return spring 58 employed in the first embodiment is shown in FIG. 17. In place of the tension spring 58 which biases synchronizer rings 35 of both sides to move towards each other, a pair of compression coil springs 158 are disposed between the respective drive gears 26, 27 and synchronizer rings 35 for biasing each of the synchronizer rings 35 individually to move towards the neutral position thereof. Although return springs are increased in number, the structure shown in FIG. 17 permits an easier assemblage of the clutch mechanism as compared to the structure shown in FIG. 2.

Although only double-acting clutch assemblies are shown, the synchronizing clutch assembly according to the present invention may, of course, be designed as a single-acting clutch assembly which operates to couple a single gear to a transmission shaft.

We claim:

1. A synchronizing clutch assembly comprising: a transmission shaft; a drive gear having an integral clutch gear and mounted rotatably on said transmission shaft, said clutch gear having at an inner circumference thereof a cone-shaped first clutch surface; a hub member having at an outer circumference thereof first splines and mounted fixedly on said transmission shaft; an axially shiftable sleeve member having at an inner circumference thereof second splines which may engage with said clutch gear, said sleeve member being mounted on said hub member slidably but non-rotatably by a splined connection between said first and second splines; a synchronizer ring having at an outer circumference thereof a cone-shaped second clutch surface, engageable frictionally with said first clutch surface, and third splines with which said second splines may be meshed, said hub member including a diameter-reduced end portion on which said synchronizer ring is slidably mounted; and a key member received slidably in an axial groove, formed in the outer circumference of said hub member, and operable to thrust said synchronizer ring, when moved towards the said ring, to cause a frictional engagement between said first and second clutch surfaces, said key member having at an outer surface thereof a projection, adapted to be received in an annular recess formed in the inner circumference of said sleeve member, and being biased to move radially outwardly of said hub member so as to engage at said projection with said sleeve member co-slidably so that, when said sleeve member is shifted from a neutral position thereof towards said clutch gear, said key member is moved towards said synchronizer ring, said clutch assembly characterized in:

> that a cam means (45, 46, 47; 45A, 45B, 46A, 46B, 47; 145A, 145B, 146A, 146B) is disposed between opposite end faces of said synchronizer ring (35) and said hub member (31), said cam means including in said end faces ramp surfaces oblique relative to a rotational direction of said clutch gear (28) and operable by a rotational displacement of said synchronizer ring (35) relative to said hub member (31), which displacement is caused as a result of a frictional engagement between said first and second clutch surfaces (29, 36), to cause an engagement of said synchronizer ring with said hub member in said rotational direction of said clutch gear and to force said synchronizer ring to move towards said clutch gear;
>
> that a stopper means (48, 49) is provided on the outer circumference of said synchronizer ring (35) such that, when said sleeve member (33) is in its neutral position, said stopper means engages said key member (39) so as to prevent a rotational displacement of said synchronizer ring, whereas a recess (50) is formed in an inner surface of said key member such that, when said key member is displaced from a neutral position thereof towards said clutch gear (28) by a predetermined small amount, the said recess releases said stopper means from the engagement with said key member so as to permit a rotational displacement of said synchronizer ring; and
>
> that a ramp surface (51; 51A, 51B) is formed on one of inner end faces of said recess (50) of said key member (39), positioned nearer to said clutch gear (28) than the other inner end face (52), such that when said key member is displaced axially away from said clutch gear in a condition where said stopper means (48, 49) is located within said recess, the said ramp surface pushes said stopper means so as to rotate said synchronizer ring (35) towards a direction of moving said stopper means out of said recess of said key member.

2. A synchronizing clutch assembly comprising: a transmission shaft; a drive gear having an integral clutch gear and mounted rotatably on said transmission shaft, said clutch gear having at an inner circumference thereof a cone-shaped first clutch surface; a hub member having at an outer circumference thereof first splines and mounted fixedly on said transmission shaft; an axially shiftable sleeve member having at an inner circumference thereof second splines which may engage with said clutch gear, said sleeve member being mounted on said hub member slidably but non-rotatably by a splined connection between said first and second splines; a synchronizer ring having at an outer circumference thereof a cone-shaped second clutch surface, engageable frictionally with said first clutch surface, and third splines with which said second splines may be meshed, said hub member including a diameter-reduced end portion on which said synchronizer ring is slidably mounted; and a key member received slidably in an axial groove, formed in the outer circumference of said hub member, and operable to thrust said synchronizer ring, when moved towards the said ring, to cause a frictional engagement between said first and second clutch surfaces, said key member having at an outer surface thereof a projection, adapted to be received in an annular recess formed in the inner circumference of said sleeve member, and being biased to move radially outwardly of said hub member so as to engage at said projection with said sleeve member co-slidably so that, when said sleeve member is shifted from a neutral position thereof towards said clutch gear, said key member is moved towards said synchronizer ring, said clutch assembly characterized in:

> that at least one pair of cam grooves having bottom ramp surfaces (45, 46) are formed in opposite end faces of said synchronizer ring (35) and said hub member (31), said bottom ramp surfaces being inclined such that axial interval therebetween becomes reduced by a rotational displacement of said synchronizer ring relative to said hub member towards a rotational direction of said clutch gear (28), said pair of cam grooves including therein a ball (47);
>
> that said synchronizer ring (35) has at an outer circumference thereof a first projection (48), which engages at said neutral position of the sleeve member (33) with said key member (39) from an upstream side of said rotational direction of the clutch gear (28), and a second projection (49) which engages at said neutral position of the sleeve member with said key member from a downstream side of said rotational direction of the clutch gear, whereas a recess (50) is formed in an inner surface of said key member such that, when said key member is displaced from a neutral position thereof towards said clutch gear by a predetermined small amount, the said recess releases said first projection from the engagement with said key member so as to permit a rotational displacement of said synchronizer ring towards said rotational direction of the clutch gear; and
>
> that one of inner end faces of said recess (50) of said key member (39), positioned nearer to said clutch gear (28) than the other end face (52), includes thereon a ramp surface (51) having an inclination such that, when said key member is displaced axially away from said clutch gear in a condition where said first projection (48) is located within said recess (50) of said key member, the said ramp surface pushes said first projection so as to rotate said synchronizer ring (35) towards a direction reverse to said rotational direction of the clutch gear.

3. A synchronizing clutch assembly comprising: a transmission shaft; a pair of axially spaced drive gears mounted rotatably on said transmission shaft, each of said drive gears having an integral clutch gear which includes at an inner circumference thereof a cone-shaped first clutch surface; a hub member disposed between said pair of drive gears and mounted fixedly on said transmission shaft, said hub member having at an outer circumference thereof first splines; an axially shiftable sleeve member having at an inner circumference thereof second splines which may engage with said clutch gear, said sleeve member being mounted on said hub member slidably but nonrotatably by a splined connection between said first and second splines; a pair of synchronizer rings each having at an outer circumference thereof a cone-shaped second clutch surface, engageable frictionally with said first clutch surface, and third splines with which said second splines may be meshed, said hub member including a pair of diameter-reduced end portions on which said pair of synchronizer rings are slidably mounted; and a key member received slidably in a key-receiving axial groove, formed in the outer circumference of said hub member, and operable to thrust each of said synchronizer rings, when moved towards said each synchronizer ring, to cause a frictional engagement between said first and second clutch surfaces, said key member having at an outer surface thereof a projection, adapted to be received in an annular recess formed in the inner circumference of said sleeve member, and being biased to move radially outwardly of said hub member so as to engage at said projection with said sleeve member coslidably so that, when said sleeve member is shifted from a neutral position thereof towards said clutch gear, said key member is moved towards each of said synchronizer rings, aid clutch assembly characterized in:

that at least one pair of cam grooves having bottom ramp surfaces (45, 46) are formed in opposite end faces of each of said synchronizer rings (35) and said hub member (31), said bottom ramp surfaces being inclined such that axial interval therebetween becomes reduced by a rotational displacement of said each synchronizer ring relative to said hub member towards a rotational direction of said clutch gear (28), said pair of cam grooves including therein a ball (47);

that each of said synchronizer rings (35) has at an outer circumference thereof a first projection (48), which engages at said neutral position of said sleeve member (33) with said key member (39) from an upstream side of said rotational direction of said clutch gear (28), and a second projection (49) which engages at said neutral position of the sleeve member with said key member from a downstream side of said rotational direction of said clutch gear, said first and second projections of said pair of synchronizer rings being arranged such that even at a condition where said key member is located at a position closest to said clutch gear of one side an end portion of said key member still remains between said first and second projections of said synchronizer ring of the other side, whereas a pair of axially spaced recesses (50) are formed in an inner surface of said key member such that, when said key member is displaced from a neutral position thereof towards said clutch gear (28) by a predetermined small amount, each of the said recesses releases each of said first projections from the engagement with said key member so as to permit a rotational displacement of each of said synchronizer rings towards said rotational direction of said clutch gear; and that said hub member (31) is provided at a bottom surface of said key-receiving groove (38) with portions (54) which limit an axial sliding movement of said key member (39) within a predetermined range at a condition where said projection (41) of the key member is out of said annular recess (40) of the sleeve member (33) and said key member is pushed down by said sleeve member within said key-receiving groove radially inwardly of said hub member, one of inner end faces of each of said recesses (50) of said key member, positioned nearer to said clutch gear (28) than the other end face (52), including thereon a ramp surface (51) having an inclination such that, when said key member is displaced axially away from said clutch gear in a condition where each of said first projections (48) is located within said each recess of said key member, the said ramp surface pushes said each first projection so as to rotate each of said synchronizer ring (35) towards a direction reverse to said rotational direction of said clutch gear.

4. A synchronizing clutch assembly as claimed in claim 3, characterized in that said key member (39) is formed to have a T-shaped configuration including a depending leg portion, which extends from an axial mid portion of said key member radially inwardly of said hub member (31), and a pair of axial extensions which extend towards said pair of synchronizer rings (35), a pair of thrusting surfaces (59) for thrusting said pair of synchronizer rings (35) being provided by one and the other axial end faces of said leg portion and said pair of recesses (50) of said key member being formed in inner surfaces of said pair of axial extensions.

5. A synchronizing clutch assembly as claimed in claim 3, characterized in that said key member (39) includes at an axial mid location of an inner surface thereof a notch (44) and said hub member (31) receives therein a latch pin (42) which is disposed slidably along a radial direction of said hub member so that said pin may project into said notch at the neutral position of said sleeve member (33), said pin being biased to move radially outwardly of said hub member by a spring (43) disposed within said hub member, said spring constituting a sole biasing means for biasing said key member radially outwardly of said hub member.

6. A synchronizing clutch assembly as claimed in claim 3, characterized in that said pair of synchronizer rings (35) are biased to move towards each other by a tension spring (58) which extends through an axial thorough bore (57), formed in said hub member (31), and are hooked at both ends thereof to said synchronizer rings.

7. A synchronizing clutch assembly as claimed in claim 3, characterized in that each of said synchronizer rings (35) is biased to move towards said hub member (31) by a compression spring (158) which is disposed between each of said drive gears (26, 27) and said each synchronizer ring.

8. A synchronizing clutch assembly comprising: a transmission shaft; a drive gear having an integral clutch gear and mounted rotatably on said transmission shaft, said clutch gear having at an inner circumference thereof a cone-shaped first clutch surface; a hub member having at an outer circumference thereof first splines and mounted fixedly on said transmission shaft; an axially shiftable sleeve member having at an inner circumference thereof second splines which may engage with said clutch gear, said sleeve member being mounted on said hub member slidably but non-rotatably by a splined connection between said first and second splines; a synchronizer ring having at an outer circumference thereof a cone-shaped second clutch surface, engageable frictionally with said first clutch surface, and third splines with which said second splines may be meshed, said hub member including a diameter-reduced end portion on which said synchronizer ring is slidably mounted; and a key member received slidably in an axial groove, formed in the outer circumference of said hub member, and operable to thrust said synchronizer ring, when moved towards the said ring, to cause a frictional engagement between said first and second clutch surfaces, said key member having at an outer surface thereof a projection, adapted to be received in an annular recess formed in the inner circumference of said sleeve member, and being biased to move radially outwardly of said hub member so as to engage at said projection with said sleeve member co-slidably so that, when said sleeve member is shifted from a neutral position thereof towards said clutch gear, said key member is moved towards said synchronizer ring, said clutch assembly characterized in:

that at least one pair of cam grooves having first and second pairs of bottom ramp surfaces (45A, 46A, 45B, 46B) are formed in opposite end faces of said synchronizer ring (35) and said hub member (31), said first pair of bottom ramp surfaces (45A, 46A) being inclined such that axial interval therebetween becomes reduced by a rotational displacement of said synchronizer ring relative to said hub member towards a first direction, whereas said second pair of bottom ramp surfaces (45B, 46B) being inclined such that axial interval therebetween becomes reduced by a rotational displacement of said synchronizer ring relative to said hub member towards a second direction, said pair of cam grooves including therein a ball (47);

that said synchronizer ring (35) has at an outer circumference thereof a first projection (48), which engages at said neutral position of the sleeve member (33) with said key member (39) from said first direction, and a second projection (49) which engages at said neutral position of the sleeve member with said key member from said second direction, whereas a recess (50) is formed in an inner surface of said key member such that, when said key member is displaced from a neutral position thereof towards said clutch gear (28) by a predetermined small amount, the said recess releases said first and second projections from the engagement with said key member so as to permit rotational displacement of said synchronizer ring towards said first and second directions; and that one of inner end faces of said recess (50) of said key member (39), positioned nearer to said clutch gear (28) than the other end face (52), includes thereon first and second ramp surfaces (51A, 51B), said first ramp surface (51A) having an inclination such that, when said key member is displaced axially away from said clutch gear in a condition where said first projection (48) is located within said recess (50) of said key member, said first ramp surface pushes said first projection so as to rotate said synchronizer ring (35) towards said second direction, whereas said second ramp surface (51B) having an inclination such that, when said key member is displaced axially away from said clutch gear in a condition where said second projection (49) is located within said recess (50) of said key member, said second ramp surface pushes said second projection so as to rotate said synchronizer ring towards said first direction.

9. A synchronizing clutch assembly comprising: a transmission shaft; a pair of axially spaced drive gears mounted rotatably on said transmission shaft, each of said drive gears having an integral clutch gear which includes at an inner circumference thereof a cone-shaped first clutch surface; a hub member disposed between said pair of drive gears and mounted fixedly on said transmission shaft, said hub member having at an outer circumference thereof first splines; an axially shiftable sleeve member having at an inner circumference thereof second splines which may engage with said clutch gear, said sleeve member being mounted on said hub member slidably but non-rotatably by a splined connection between said first and second splines; a pair of synchronizer rings each having at an outer circumference thereof a cone-shaped second clutch surface, engageable frictionally with said first clutch surface, and third splines with which said second splines may be meshed, said hub member including a pair of diameter-reduced end portions on which said pair of synchronizer rings are slidably mounted; and a key member received slidably in a key-receiving axial groove, formed in the outer circumference of said hub member, and operable to thrust each of said synchronizer rings, when moved towards said each synchronizer ring, to cause a frictional engagement between said first and second clutch surfaces, said key member having at an outer surface thereof a projection, adapted to be received in an annular recess formed in the inner circumference of said sleeve member, and being biased to move radially outwardly of said hub member so as to engage at said projection with said sleeve member co-slidably so that, when said sleeve member is shifted from a neutral position thereof towards said clutch gear, said key member is moved towards each of said synchronizer rings, said clutch assembly characterized in:

that at least one pair of cam grooves having first and second pairs of bottom ramp surfaces (45A, 46A, 45B, 46A) are formed in opposite end faces of each of said synchronizer rings (35) and said hub member (31), said first pair of bottom ramp surfaces (45A, 46A) being inclined such that axial interval therebetween becomes reduced by a rotational displacement of said each synchronizer ring relative to said hub member towards a first direction, whereas said second pair of bottom ramp surfaces (45B, 46B) being inclined such that axial interval therebetween becomes reduced by a rotational displacement of said each synchronizer ring relative to said hub member towards a second direction, said pair of cam grooves including therein a ball (47);

that each of said synchronizer rings (35) has at an outer circumference thereof a first projection (48), which engages at said neutral position of the sleeve member (33) with said key member (39) from said first direction, and a second projection (49) which engages at said neutral position of the sleeve member with said key member from said second direction, said first and second projections of said pair of synchronizer rings being arranged such that even at a condition where said key member is located at a position closest to said clutch gear of one side an end portion of said key member still remains between said first and second projections of said synchronizer ring of the other side, whereas a pair of axially spaced recesses (50) are formed in an inner surface of said key member such that, when said key member is displaced axially from a neutral position thereof towards said clutch gear (28) by a predetermined small amount, each of said recesses releases each of said first and second projections of said each synchronizer ring from the engagement with said key member so as to permit rotational displacement of said each sychronizer ring towards said first and second directions; and that said hub member (31) is provided at a bottom surface of said key-receiving groove (38) with portions (54) which limit an axial sliding movement of said key member (39) within a predetermined range at a condition where said projection (41) of the key member is out of said annular recess (40) of the sleeve member (33) and said key member is pushed down by said sleeve member within said key-receiving groove radially inwardly of said hub member, one of inner end faces of each of said recesses (50) of said key member, positioned nearer to said clutch gear (28) than the other end face (52), including thereon first and second ramp surfaces (51A, 51B), said first ramp surface (51A) having an inclination such that, when said key member (39) is displaced axially away from said clutch gear in a condition where each of said first projections (48) is located within said each recess of the key member, said first ramp surface pushes said each first projection so as to rotate each of said synchronizer rings (35) towards said second direction, whereas said second ramp surface (51B) having an inclination such that, when said key member is displaced axially away from said clutch gear in a condition where each of said second projections (49) is located within said each recess of the key member, said second ramp surface pushes said each second projection so as to rotate said each synchronizer ring towards said first direction.

10. A synchronizing clutch assembly as claimed in claim 9, characterized in that said key member (39) is formed to have a T-shaped configuration including a depending leg portion, which extends from an axial mid portion of said key member radially inwardly of said hub member (31), and a pair of axial extensions which extend towards said pair of synchronizer rings (35), a pair of thrusting surfaces (59) for thrusting said pair of synchronizer rings (35) being provided by one and the other axial end faces of said leg portion and said pair of recesses (50) of said key member being formed in inner surface of said pair of axial extensions.

11. A synchronizing clutch assembly as claimed in claim 9, characterized in that said key member (39) includes at an axial mid location of an inner surface thereof a notch (44) and said hub member (31) receives therein a latch pin (42) which is disposed slidably along a radial direction of said hub member so that said pin may project into said notch at the neutral position of said sleeve member (33), said pin being biased to move radially outwardly of said hub member by a spring (43) disposed within said hub member, said spring constituting a sole biasing means for biasing said key member radially outwardly of said hub member.

12. A synchronizing clutch assembly as claimed in claim 9, characterized in that said pair of synchronizer rings (35) are biased to move towards each other by a tension spring (58) which extends through an axial thorough bore (57), formed in said hub member (31), and are hooked at both ends thereof to said synchronizer rings.

* * * * *

UNITED STATES PATENT AND TRADEMARK OFFICE
CERTIFICATE OF CORRECTION

PATENT NO. : 4,869,353

DATED : September 26, 1989

INVENTOR(S) : Kazuhiko Ohtsuki et al

It is certified that error appears in the above-identified patent and that said Letters Patent is hereby corrected as shown below:

Col. 27, line 31 change "aid" to --said--.

Col. 32, line 17 change "surface" to --surfaces--.

Signed and Sealed this

Twenty-eighth Day of August, 1990

*Attest:*

HARRY F. MANBECK, JR.

*Attesting Officer*  *Commissioner of Patents and Trademarks*